United States Patent
Li et al.

(10) Patent No.: US 12,449,977 B2
(45) Date of Patent: Oct. 21, 2025

(54) LOW LATENCY MULTIPLE STORAGE DEVICE SYSTEM

(71) Applicant: Samsung Electronics Co., Ltd., Suwon-si (KR)

(72) Inventors: Zongwang Li, Dublin, CA (US); Marie Mai Nguyen, Pittsburgh, CA (US); Heekwon Park, San Jose, CA (US); Mehran Elyasi, Saint Paul, MN (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/694,662

(22) Filed: Mar. 14, 2022

(65) Prior Publication Data

US 2022/0374149 A1    Nov. 24, 2022

Related U.S. Application Data

(60) Provisional application No. 63/302,561, filed on Jan. 24, 2022, provisional application No. 63/191,916, filed on May 21, 2021.

(51) Int. Cl.
  G06F 3/00    (2006.01)
  G06F 3/06    (2006.01)
  G06F 12/00   (2006.01)

(52) U.S. Cl.
  CPC .......... G06F 3/0611 (2013.01); G06F 3/0659 (2013.01); G06F 3/0683 (2013.01)

(58) Field of Classification Search
  CPC ..... G06F 3/0611; G06F 3/0659; G06F 3/0683
  USPC ........................................................ 711/167
  See application file for complete search history.

(56) References Cited

U.S. PATENT DOCUMENTS

| | | | |
|---|---|---|---|
| 6,477,610 B1 * | 11/2002 | Willenborg | G06F 13/30 710/308 |
| 7,620,772 B1 * | 11/2009 | Liikanen | G11B 27/3027 711/170 |
| 7,917,903 B2 * | 3/2011 | Lumb | G06F 9/4887 718/100 |
| 8,954,831 B2 | 2/2015 | Anholt et al. | |
| 9,176,708 B2 * | 11/2015 | Gallant | G06F 7/24 |
| 9,236,890 B1 | 1/2016 | Anholt et al. | |
| 9,477,412 B1 * | 10/2016 | Amar | G06F 12/0862 |
| 9,712,401 B2 * | 7/2017 | Wright | H04L 41/5067 |
| 9,772,787 B2 * | 9/2017 | Oikarinen | G06F 3/064 |
| 9,971,534 B2 * | 5/2018 | Starr | G06F 1/3275 |

(Continued)

FOREIGN PATENT DOCUMENTS

| WO | 2018226278 A1 | 12/2018 |
|---|---|---|
| WO | 2019204017 A1 | 10/2019 |

OTHER PUBLICATIONS

2024.*

(Continued)

Primary Examiner — Sheng Jen Tsai
(74) Attorney, Agent, or Firm — Renaissance IP Law Group LLP

(57) ABSTRACT

A system is disclosed. A storage device may store a data. A load module may read the data from the storage device based at least in part on an input/output (I/O) request. A scheduler may place the I/O request in a queue for delivery to the load module based at least in part on a size of the I/O request being less than a threshold.

24 Claims, 14 Drawing Sheets

(56) References Cited

U.S. PATENT DOCUMENTS

| | | | |
|---|---|---|---|
| 10,230,403 B2 | 3/2019 | Freudenberger et al. | |
| 10,318,174 B2* | 6/2019 | Kim | G06F 3/0659 |
| 10,884,667 B2* | 1/2021 | Yu | G06F 3/067 |
| 11,068,342 B1 | 7/2021 | Alrod et al. | |
| 11,099,754 B1* | 8/2021 | Mallick | G06F 3/061 |
| 11,139,831 B2 | 10/2021 | Zhang et al. | |
| 11,403,253 B2* | 8/2022 | Pandya | H04L 49/9031 |
| 11,581,943 B2* | 2/2023 | Dreier | G06F 3/0604 |
| 11,637,786 B1* | 4/2023 | Matthews | H04L 45/24 370/235 |
| 11,740,812 B2* | 8/2023 | Frolikov | G06F 12/0246 711/103 |
| 11,762,598 B2* | 9/2023 | Kanno | G06F 3/0679 711/154 |
| 11,800,381 B2* | 10/2023 | Chisu | H04W 76/10 |
| 2001/0025363 A1* | 9/2001 | Ussery | G06F 30/30 716/128 |
| 2003/0037168 A1* | 2/2003 | Brabson | H04L 45/04 709/249 |
| 2005/0239473 A1* | 10/2005 | Pan | H04W 28/0967 455/450 |
| 2007/0156955 A1* | 7/2007 | Royer, Jr. | G06F 13/387 711/113 |
| 2007/0162354 A1* | 7/2007 | Chiu | G06Q 10/06 705/26.81 |
| 2008/0244209 A1* | 10/2008 | Seelam | G06F 3/0659 711/E12.001 |
| 2009/0265506 A1* | 10/2009 | Yim | G06F 3/0664 707/999.2 |
| 2010/0171655 A1* | 7/2010 | Rhodes | G01S 19/258 342/357.25 |
| 2011/0289296 A1* | 11/2011 | Saito | G06F 3/0685 711/E12.078 |
| 2012/0066448 A1* | 3/2012 | Colgrove | G06F 3/0689 711/E12.001 |
| 2012/0110417 A1 | 5/2012 | D'Abreu et al. | |
| 2012/0303842 A1* | 11/2012 | Cardinell | G06F 13/28 710/22 |
| 2013/0212349 A1 | 8/2013 | Maruyama | |
| 2013/0311707 A1* | 11/2013 | Kawamura | G06F 12/0246 711/E12.008 |
| 2016/0266934 A1* | 9/2016 | Rimoni | G06F 3/0659 |
| 2016/0291884 A1* | 10/2016 | Halaharivi | G06F 3/0659 |
| 2018/0121366 A1 | 5/2018 | Tian | |
| 2018/0211708 A1* | 7/2018 | Igahara | G11C 16/105 |
| 2018/0217951 A1* | 8/2018 | Benisty | G06F 13/1642 |
| 2018/0321844 A1* | 11/2018 | Benisty | G06F 13/1642 |
| 2018/0322075 A1* | 11/2018 | Kim | G06F 13/1626 |
| 2019/0196969 A1* | 6/2019 | Yang | G06F 3/061 |
| 2019/0251039 A1* | 8/2019 | Modi | G06F 3/061 |
| 2019/0265909 A1* | 8/2019 | Frolikov | G06F 13/1642 |
| 2019/0303024 A1* | 10/2019 | Iwai | G06F 3/061 |
| 2020/0089430 A1* | 3/2020 | Kanno | G06F 3/0659 |
| 2020/0127685 A1 | 4/2020 | Chen et al. | |
| 2020/0167098 A1 | 5/2020 | Shah et al. | |
| 2020/0293465 A1* | 9/2020 | Yang | H04L 49/35 |
| 2020/0310690 A1* | 10/2020 | Annavaram | G06F 3/0659 |
| 2020/0348977 A1* | 11/2020 | Yi | G06F 3/0613 |
| 2020/0356621 A1* | 11/2020 | Chen | G06N 20/00 |
| 2021/0096760 A1* | 4/2021 | Cho | G06F 3/0679 |
| 2021/0117316 A1 | 4/2021 | Jia et al. | |
| 2021/0232339 A1 | 7/2021 | Mehra | |
| 2021/0255971 A1* | 8/2021 | Kim | G06F 3/0611 |
| 2021/0263676 A1 | 8/2021 | Patel et al. | |
| 2021/0263677 A1 | 8/2021 | Patel et al. | |
| 2021/0286557 A1* | 9/2021 | Kim | G06F 3/0673 |
| 2022/0269442 A1* | 8/2022 | Jeong | G06F 3/0611 |
| 2022/0300214 A1* | 9/2022 | Kanno | G06F 12/0246 |
| 2022/0342703 A1* | 10/2022 | Hong | G06F 9/5011 |
| 2022/0374149 A1* | 11/2022 | Li | G06F 3/0611 |
| 2024/0168819 A1* | 5/2024 | Nguyen | G06F 9/5044 |
| 2024/0264863 A1* | 8/2024 | Yang | G06F 9/3836 |

OTHER PUBLICATIONS

Bjorling, Matias et al., "Linux Block IO: Introducing Multi-Queue SSD Access on Multi-Core Systems", Proceedings of the 6th International Systems and Storage Conference, 2013, 10 pages.

Mansour, Mohammad M. et al., "Turbo Decoder Architectures for Low-Density Parity-Check Codes", Global Telecommunications Conference, 2002, GLOBECOM '02. IEEE, 2002, pp. 1383-1388.

Naumov, Maxim et al., "Deep Learning Recommendation Model for Personalization and Recommendation Systems" arXiv preprint arXiv:1906.00091 (2019), 10 pages.

Shin, Woong et al., "OS I/O Path Optimizations for Flash Solid-State Drives" 2014 USENIX Annual Technical Conference, 2014, 7 pages.

Tavakkol, Arash et al., "MQSim: A Framework for Enabling Realistic Studies of Modern Multi-Queue SSD Devices", 16th USENIX Conference on File and Storage Technologies, 2018, 18 pages.

Wilkening, Mark et al., "RecSSD: Near Data Processing forSolid State Drive Based Recommendation Inference" Proceedings of the 26th ACM International Conference on Architectural Support for Programming Languages and Operating Systems, ASPLOS 26, 2021, 13 pages.

Office Action for U.S. Appl. No. 17/694,657, mailed May 24, 2023.

European Extended Search Report for Application No. 23152227.7, mailed Jun. 2, 2023.

Notice of Allowance for U.S. Appl. No. 17/694,657, mailed Oct. 12, 2023.

European Office Action for Application No. 23152227.7, mailed Feb. 5, 2024.

Ke, Liu et al., "RecNMP: Accelerating Personalized Recommendation with Near-Memory Processing," 2020 ACM/IEEE 47th Annual International Symposium on Computer Architecture (ISCA), 2020, pp. 790-803.

European Office Action for Application No. 23152227.7, mailed Nov. 11, 2024.

* cited by examiner

LOW LATENCY MULTIPLE STORAGE DEVICE SYSTEM

RELATED APPLICATION DATA

This application claims the benefit of U.S. Provisional Patent Application Ser. No. 63/302,561, filed Jan. 24, 2022, and U.S. Provisional Patent Application Ser. No. 63/191,916, filed May 21, 2021, both of which are incorporated by reference herein for all purposes.

FIELD

The disclosure relates generally to storage devices, and more particularly to a system including storage devices that enables low read latency.

BACKGROUND

Some applications may depend on data that is large in size. If this data is not already stored in memory, the data may be read from storage devices. But accessing data from a single storage device may form a bottleneck, slowing down data access and the resulting computations.

A need remains to provide for low latency access to data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
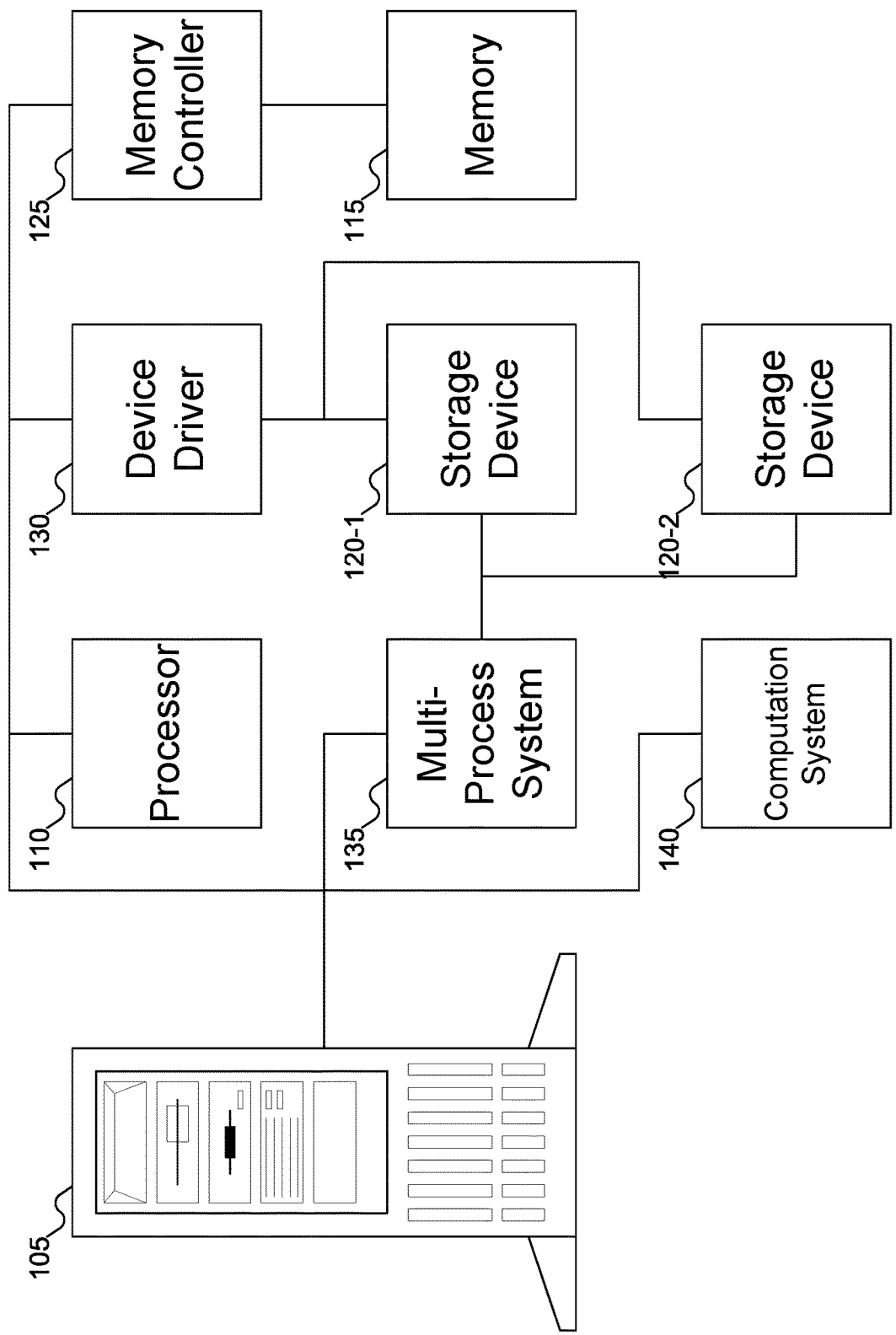
FIG. 1 shows a machine configured to support low latency access to storage devices in processing computations, according to embodiments of the disclosure.

Embodiments of the disclosure may include a system. The system may include a storage device to store data and a load module to read the data from the storage device. A scheduler may receive an input/output (I/O) request and deliver the I/O request to the load module based on a size of the I/O request.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some applications, such as deep learning recommendation models (DLRMs), may rely on large amounts of data. DLRMs may rely on embedding tables, which may be terabytes in size. Transferring large amounts of data from a storage device to a memory for processing may take time. This issue may be exacerbated if multiple applications are attempting to process data stored on the storage device, as the storage device may have a bandwidth limit insufficient for all the data requested.

Embodiments of the disclosure address these concerns by introducing a system of storage devices. The storage devices may be, for example, Solid State Drives (SSDs). Data may be distributed across the storage devices, which may reduce the load on an individual storage device to provide all the requested data. A scheduler may schedule I/O requests into one or more queues based on the size of the data to be retrieved. An input/output (I/O) process manager may retrieve requests from the queues and may identify load modules to retrieve data from storage devices.

FIG. 1 shows a machine configured to support low latency access to storage devices in processing computations, according to embodiments of the disclosure. In FIG. 1, machine 105, which may also be termed a host or a system, may include processor 110, memory 115, and storage devices 120-1 and 120-2 (which may be referred to collectively as storage devices 120). Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage devices 120 may be accessed using device driver 130. While FIG. 1 shows two storage devices 120, there may be any number (one or more) of storage devices in machine 105. Storage devices 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, storage device 120-1 might be a hard disk drive, and storage device 120-2 might be an SSD.

Machine 105 may also include multi-process system 135 and computation system 140. Multi-process system 135 may manage reading data from storage devices 120 based on input/output (I/O) requests received from applications running on processor 110 (or on processors on remote machines not shown in FIG. 1). The I/O requests may request data from storage devices 120 that may be used in computation processes. That is, given a computation request, the data to be processed by the computation request may first be requested from storage devices 120 in an I/O request processed by multi-process system 135. Multi-process system 135 may schedule reading data from storage devices 120 based on the size of the I/O request, in order to reduce the latency (the time required to complete the computation processes, including the time required to read the data and execute the appropriate commands on the data). Multi-process system 135 is discussed further with reference to FIG. 3 below.

Once the data is read by multi-process system 135, computation system 140 may execute the computation process to process the data. Computation system 140 is discussed further with reference to FIG. 8 below.

As mentioned above, machine 105 may include multiple storage devices 120. By including more than one storage device 120, the data requested in an I/O request might be distributed across storage devices 120. By distributing the data across storage devices 120, read requests may be processed by each storage device 120: if these read requests are processed in parallel, the requested data might be read faster than if all the data were stored on only one storage device 120. But embodiments of the disclosure may include one storage device 120 (without the potential benefit of reading the data in parallel from multiple storage devices 120).

While FIG. 1 shows machine 105 as including multi-process system 135 and computation system 140, embodiments of the disclosure may have these components located elsewhere. For example, multi-process system 135 might be included as part of machine 105, while computation system 140 might be part of another machine reached across a network. In fact, embodiments of the disclosure might separate storage devices 120, multi-process system 135, and computation system 140 each on separate machines 105, connected via some network or communication path.

Figure 2:
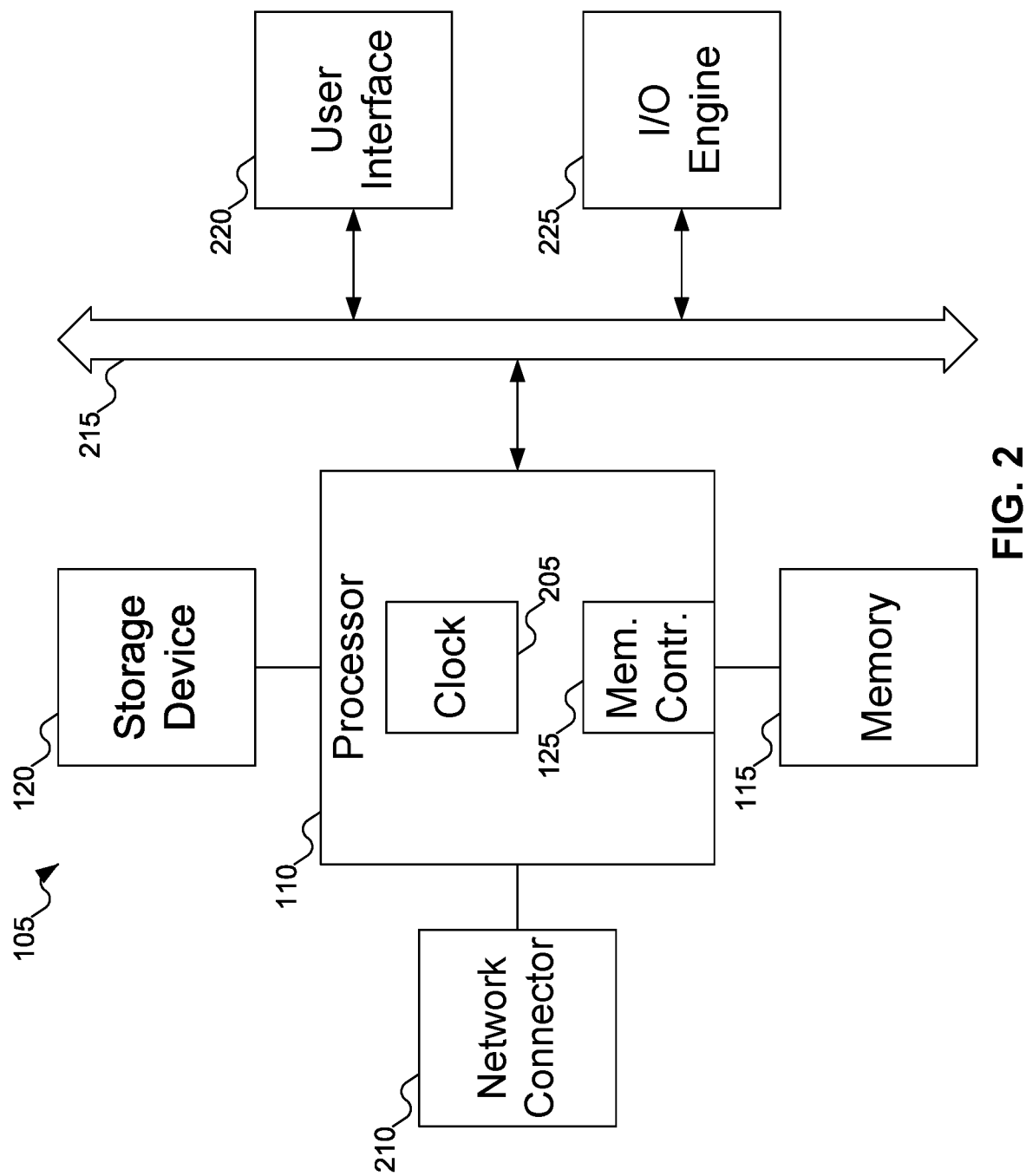
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Before explaining the structure and operation of multi-process system 135 of FIG. 1, it may be helpful to consider various requests that may be processed using machine 105 of FIG. 1. An example application that may be running on processor 110 of FIG. 1 is a deep learning recommendation model (DLRM), which is an example of a machine learning algorithm. The DLRM application may have established a service level agreement (SLA) that may govern how long it should take to process a query. Put another way, the DLRM may expect a particular query to take a certain amount of time: if the query takes longer than that amount of time, the DLRM may wait longer than expected before it continues processing.

To execute the query, machine 105 of FIG. 1 may need to retrieve the data in question and then perform a computation process on that data. Both retrieving the data and processing the computations may take some amount of time.

If the query is relatively small (say, involving fewer than 256 data points), retrieving the data may be relatively fast, and the overall process of executing the query may satisfy the SLA. But if the query is relatively large (say, involving more than 256 data points), retrieving the data might take a long enough amount of time that the SLA might not be satisfied. Since the DLRM may have variable query sizes, relatively large queries might be expected to occur, and the process of retrieving the stored data might be larger than the time required to execute the computation process. Since it is not desirable for machine 105 of FIG. 1 to fail to satisfy the SLA, it is desirable to reduce the time required to retrieve the data from storage devices 120 of FIG. 1: that is, to achieve a low latency for data retrieval.

Figure 3:
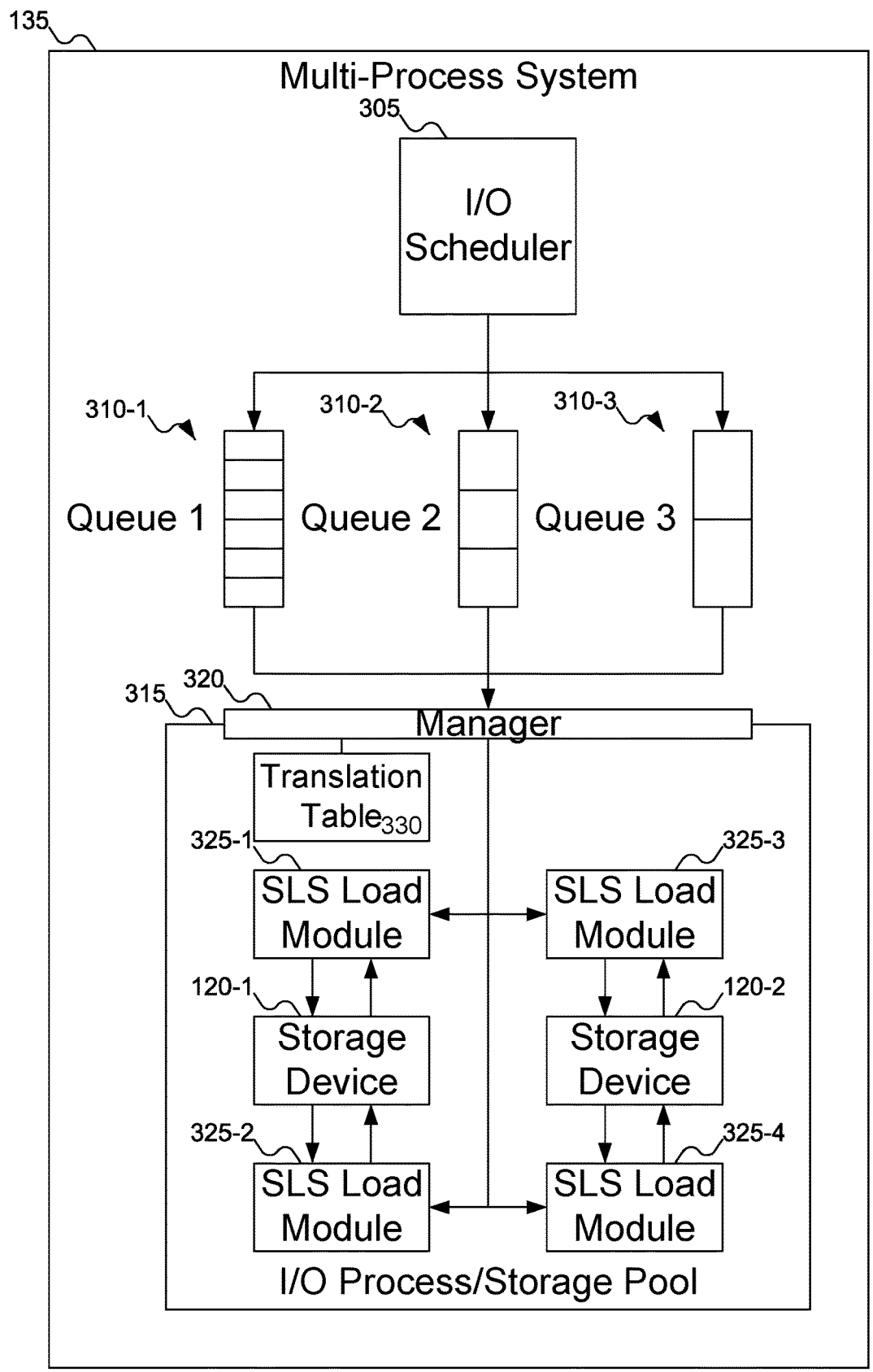
FIG. 3 shows details of the multi-process system of FIG. 1, according to embodiments of the disclosure.

FIG. 3 shows details of multi-process system 135 of FIG. 1, according to embodiments of the disclosure. In FIG. 3, multi-process system 135 may include I/O scheduler 305, queues 310-1, 310-2, and 310-3 (which may be referred to collectively as queues 310), and I/O process/storage pool 315.

I/O scheduler 305 may receive I/O requests from applications running on processor 110 of FIG. 1. Such requests may identify the data to be read from storage devices 120, for use in a computation request (to be processed by computation system 140 of FIG. 1).

I/O scheduler may determine the size of the I/O requests: that is, the amount of data to be read from storage devices 120 to be used in executing the computation process. Using the size of the I/O request, I/O scheduler may select one of queues 310 in which to place the I/O request.

In FIG. 3, three queues 310-1 through 310-3 are shown. Each queue 310 may be used to store I/O requests of varying sizes. For example, queue 310-1 might be used to store I/O requests to retrieve data (rows of an embedding table) no larger than, say, 128 vectors in size; queue 310-2 might be used to store I/O requests larger than, say, 128 vectors in size but no larger than, say, 512 vectors in size; and queue 310-3 might be used to store I/O requests larger than, say, 512 vectors in size. In this manner, I/O requests may be grouped based on approximately the amount of data to be retrieved, which may be representative of the amount of time needed to retrieve the data.

While FIG. 3 shows three queues 310, embodiments of the disclosure may include any number (one or more) of queues 310. For example, if priority queueing is used, embodiments of the disclosure might include one queue 310. If priority queueing is used, I/O scheduler 305 may determine a priority for the I/O request based on the size of the data to be read from storage devices 120, and may associate a priority tag to the I/O request in queue 310, so that I/O process/storage pool 315 may determine the relative priority of the I/O request. For example, if the I/O request requests no more than 128 embedding vectors (rows of an embedding tables) of data to be read, the priority tag may indicate that the request has priority 1; if the I/O request requests more than 128 embedding vectors of data but no more than 512 embedding vectors of data to be read, the priority tag may indicate that the request has priority 2; and if the I/O request requests more than 512 embedding vectors of data to be read, then the priority tag may indicate that the request has priority 3. As with the number of queues 310, any number of different priorities may be used: three priorities as discussed above is merely an example number of priorities.

In some embodiments of the disclosure, queues 310 may be first in, first out (FIFO) queues. In other embodiments of the disclosure, other types of queues 310 may be used.

Note that even if there is only one queue 310, the selection of the queue may still technically be based on the size of the I/O request (even if all I/O requests might be placed in that queue). Also, if there is only one queue, the queue might not be a FIFO queue. That is, I/O requests might be removed from the queue in a different order than they were added to the queue (for example, a priority 1 I/O request that is added to the queue later than a priority 2 I/O request might still be removed from the queue first and processed first).

Once I/O scheduler 305 has placed an I/O request in queues 310, I/O process/storage pool 315 may retrieve the I/O request from queues 310. By using multiple queues 310 (or by using different priorities), I/O process/storage pool 315 may select which I/O request to process next. In this manner, I/O requests may be processed by I/O process/storage pool 315 in a different order than they were sent to multi-process system 135 from applications running on processor 110 of FIG. 1.

I/O process/storage pool 315 may retrieve I/O requests from queues 310 using any desired technique. For example, I/O process/storage pool 315 might use a round robin access, retrieving an I/O request from queue 310-1, then an I/O request from queue 310-2, then an I/O request from queue 310-3, then back to queue 310-1, and so on. (Of course, if a queue 310 has no I/O requests in it, then I/O process/storage pool 315 may skip that queue 310 and move to the next queue 310 to retrieve an I/O request.)

I/O process/storage pool 315 may include manager 320, which may be responsible for retrieving I/O requests from queues 310. Manager 320 may also be responsible for determining which storage device(s) 120 store the requested data (the data might be stored on a single storage device 120, or the data might be stored on multiple storage devices 120). Once manager 320 has determined which storage device(s) 120 store the requested data, manager 320 may dispatch the I/O request to load module(s) 325-1 through 325-4 (which may be referred to collectively as load module(s) 325) to read the data from the storage device(s) 120.

In some embodiments of the disclosure, each storage device 120 may be considered as separate from the other storage devices 120. That is, there might be no predetermined relationship between or among storage devices 120 governing their use. For example, each storage device 120 might be considered not only a physically separate storage device but also a logically separate storage device (which arrangement may be compared, for example, to a Redundant Array of Independent Disks (RAID), where management of the storage of data is left to the RAID controller). But in other embodiments of the disclosure, storage devices 120 may be configured as an array, such as a RAID.

To determine which storage device(s) 120 store the data requested in the I/O request, manager 320 may access table 330. Table 330 may function similarly to a flash translation layer in a SSD. But instead of mapping a logical address (such as the logical block address of the data as used by the application) to a physical address (on the storage device), table 330 may map the logical address (or some other identifier of the data) to an identifier of storage device(s) 120 that store the requested data. Table 330 may be stored in some form of storage (for example, volatile storage such as local DRAM or non-volatile storage such as a firmware module or flash storage). The use of table 330 is discussed further with reference to FIG. 5 below.

Once manager 320 has dispatched the I/O request to load module(s) 325, load module(s) 325 may access the requested data from storage device(s) 120. For example, if the data is stored on storage device 120-1, manager 320 may dispatch the I/O request to load modules 325-1 and/or 325-2; if the data is stored on storage device 120-2, manager 320 may dispatch the I/O request to load modules 325-3 and/or 325-4. In FIG. 3, I/O process/storage pool 315 is shown as including two storage devices 120 and four load modules 325, embodiments of the disclosure may include any number (one or more) storage devices 120 and any number (one or more) load modules 325 (although there should be at least one load module 325 for each storage device 120).

Note that in FIG. 3 each storage device 120 has two load modules 325 that may access data from the storage device. In some embodiments of the disclosure, storage devices 120 may support multi-threaded access: that is, storage devices 120 may support reading data to satisfy multiple requests concurrently. For example, if storage device 120 includes multiple channels, each of which may be used independently of the others, then one thread might request data stored along one channel, and another thread might request data stored on a second channel, with both threads operating concurrently. In embodiments of the disclosure that include multiple load modules 325 that may access a storage device 120 concurrently but the data might be accessible by only one load module 325, table 330 may also include an identifier of the particular load module 325 to be used to retrieve the requested data. And in some embodiments of the disclosure, there might be only one load module 325 per storage device 120. Embodiments of the disclosure may also include combinations of these possibilities: for example, one storage device 120 might support multiple threads and may be accessed by multiple load modules 325, while another storage device 120 might not support multiple threads and so may be accessed by only one load module 325.

In FIG. 3, load modules 325 may be sparse length sum (SLS) load modules 325. SLS load modules 325 are discussed further with reference to FIG. 7 below.

Load modules 325 may use, for example, a user-space non-volatile memory express (UNVMe) driver to access storage devices 120. Whereas drivers by applications to access storage devices 120 may use a file system, UNVMe drivers may access data directly from storage devices 120, and may not use a file system. Load modules 325 may also use various application programming interfaces (APIs) provided by storage devices 120 to access the data.

As discussed with reference to FIG. 1 above, storage devices 120 may be any desired varieties of storage devices, such as hard disk drives and SSDs. In addition, variations of these varieties may also be used. For example, storage devices 120 may be SSDs optimized to store and retrieve data to satisfy DLRM queries: such SSDs might have a different architecture from an SSD intended for general use.

In some embodiments of the disclosure, data requested in an I/O request might be stored on a specific storage device 120. As a result, it might happen that multiple I/O requests may be sent to the same storage device 120. When accessing data from a particular storage device 120, load modules 325 may use submission queues to manage multiple requests of the same storage device 120. Load modules 325 may also factor in the size of the request and the availability of submission queues in an attempt to balance the load storage devices 120.

In the above discussion, how the data is stored on storage devices 120 is not discussed. In some embodiments of the disclosure, storage devices 120 may be pre-loaded with the data, and table 330 may be prepared in advance; in other embodiments of the disclosure, the applications may request that the data be written to storage devices 120, and manager 330 may select which storage device(s) 120 to write the data to (with table 330 being updated accordingly).

It would be desirable for data to be accessed roughly equally from across all storage devices 120 in I/O process/storage pool 315 (this feature may be described as load balancing). But depending on how the data is stored in storage devices 120 and what applications are requesting data from storage devices 120, the loads on each storage device 120 might not be balanced. For example, while storage devices 120-1 and 120-2 might store equal amounts of data in terms of size, it might happen that, say, 80% of the I/O requests request data stored on storage device 120-1 (and only 20% of the I/O requests request data stored on storage device 120-2). In such a situation, the unbalanced loads might result in higher than desirable latencies to access data from storage device 120-1.

To adjust for such situations, I/O process/storage pool 315 may include a migration module (not shown in FIG. 3). The migration module may be responsible for moving data around between or among storage devices 120 to achieve the desired balances. For example, some data might be migrated from storage device 120-1 to storage device 120-2 in an attempt to balance how much data is requested from each storage device.

There are other reasons why data might be moved between or among storage devices 120. While read load balance may be an important objective, it may also be important to keep the capacities of the storage devices roughly in balance (for example, to support writing new data by another application that may be distributed across storage devices 120). Or, some data may be accessed often enough, or be considered important enough, to justify such data being stored on multiple storage devices 120, to provide for redundancy.

Regardless of why data is migrated (such as for storage capacity balancing, read load balancing, or redundancy), the migration tool may update table 330 to reflect such changes. That is, if data is migrated from storage device 120-1 to storage device 120-2, table 330 may be updated to reflect the migration of that data.

Figures 4, 5:
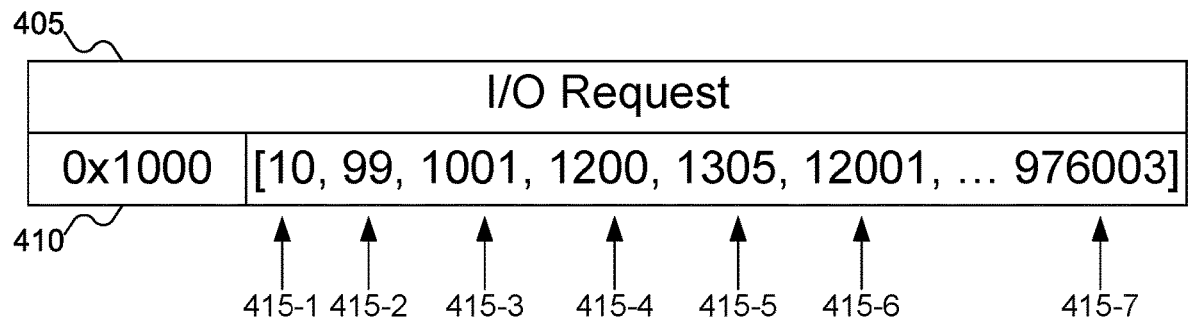
FIG. 4 shows details of an input/output (I/O) request issued to the multi-process system of FIG. 1, according to embodiments of the disclosure.
FIG. 5 shows details of the translation table of FIG. 3, according to embodiments of the disclosure.

FIG. 4 shows details of an input/output (I/O) request issued to multi-process system 135 of FIG. 1, according to embodiments of the disclosure. In FIG. 4, I/O request 405 is shown. I/O request 405 is shown as including identifier 410 and vectors 415-1 through 415-7 (which may be referred to collectively as vectors 415). For example, vectors 415 might include 64 data points, but embodiments of the disclosure may include any number of data points per vector. Identifier 410 may be an identifier of the data requested from multi-purpose system 135 of FIG. 1. For example, identifier 410 may be a logical address of the data as used by the application running on processor 110 of FIG. 1; but embodiments of the disclosure may use any desired identifier for the data.

Vectors 415 may identify specific vectors from the data that are of interest. As discussed above, DLRM queries may use data (embedding vectors) from embedding tables, which may be large (up to hundreds of GB or TB in size). But the queries might only depend on particular data within the table, and reading the entire table may take a long time relative to the amount of data actually needed. Instead, I/O request 405 may include vectors 415, which may identify particular vectors of interest in the embedding table, and all other vectors may be ignored. While FIG. 4 shows seven vectors 415 in I/O request 405, embodiments of the disclosure may include any number of vectors.

In addition, if I/O request 405 includes vectors 415, then I/O scheduler 305 of FIG. 3 may be able to determine the size of the data to be read. For example, I/O scheduler 305 of FIG. 3 may determine the number of bytes to be read by multiplying the number of vectors 415 in I/O request 405 by the number of data points in each vector 415 and by the size of each data point in each vector 415. If each vector 415 includes, for example, 128 data points, each of which requires four bytes, then the size of the data to be read by I/O request 405 may be determined as 64 (the number of vectors 415 in I/O request 405)×128 (the number of data points in each vector 415)×4 (the number of bytes for each data point)=32,768 B.

While FIG. 4 shows I/O request 405 as including only identifier 410 and vectors 415, embodiments of the disclosure may include other data, or may remove some of the data shown. For example, instead of including vectors 415, I/O request 405 might include an offset from a logical address (in FIG. 4, the logical address is used as identifier 410, but embodiments of the disclosure might distinguish between identifier 410 and the logical address for the data, in which case the logical address might be a separate data included in I/O request 405) and a number of bytes to be read (in which case the number of bytes to be read may be used to determine the size of I/O request 405). Or, I/O request 405 might include various tags not shown in FIG. 4. Embodiments of the disclosure may include any such variations on I/O request 405.

FIG. 5 shows details of table 330 of FIG. 3, according to embodiments of the disclosure. In FIG. 5, table 330 is shown as including three entries. One entry maps identifier 410-1 of a first data to identifier 505-1 of a storage device storing that data; another entry maps identifier 410-2 of a second data to identifier 505-2 of a storage device storing that data; and a third entry maps identifier 410-3 of a third data to identifier 505-3 of a storage device storing that data. While FIG. 5 shows table 330 as including three entries, embodiments of the disclosure may include any number (zero or more) entries.

Note that identifiers 505-1, 505-2, and 505-3 (which may be referred to collectively as identifiers 505) are shown as identifying particular storage devices by numbers. Table 330 might not store the actual physical address, as that information may be stored by the storage device itself. Identifiers 505 may be replaced with other information that may uniquely identify storage devices: for example, using an identifier assigned to storage devices 120 of FIG. 1 during discovery and/or enumeration, or by using a serial number of storage devices 120 of FIG. 1, among other possibilities.

While FIG. 5 suggests that each identifier 410 may be associated with a single unique identifier 505, embodiments of the disclosure may map identifiers 410 to one or more identifiers 505. If the data associated with identifier 410-1 is stored on multiple storage devices (for example, to provide redundancy), table 330 may reflect this fact. If the data in question is stored on multiple storage devices 120 of FIG. 1, then manager 320 of FIG. 3 may have the option of assigning I/O request 405 of FIG. 4 to more than one load module 325 of FIG. 3. This option may be useful, for example, in balancing the loads on storage devices 120 of FIG. 1 in I/O process/storage pool 315 of FIG. 3. For example, if storage device 120-1 of FIG. 1 has a relatively large number of I/O requests 405 of FIG. 4 waiting to be processed and the data is available from both storage devices 120-1 and 120-2 of FIG. 1, manager 320 of FIG. 3 might select load modules 325-3 or 325-4 of FIG. 3 to perform I/O request 405 from storage device 120-2 of FIG. 1.

In some embodiments of the disclosure, data requested in I/O request 405 of FIG. 4 might be stored on a single storage device 120 of FIG. 1. In such embodiments of the disclosure, identifier 505 may uniquely identify where the data represented by identifier 410 may be located. But in other embodiments of the disclosure, the data might be distributed across multiple storage devices 120 of FIG. 1. In such embodiments of the disclosure, manager 320 of FIG. 3 might determine that all the data requested in I/O request 405 of FIG. 4 may be distributed across multiple storage devices 120 of FIG. 1, and may split I/O request 405 of FIG. 4 into multiple different I/O requests, each to be sent to different load modules 325 of FIG. 3. As table 330 may identify which storage device 120 of FIG. 1 stores what data, table 330 might include multiple entries for different portions of the data.

As an example, consider again I/O request 405 of FIG. 4. I/O request 405 of FIG. 4 requests data from seven vectors 415 of FIG. 4. Manager 320 of FIG. 3 might determine that vectors 415-1 and 415-4 of FIG. 4 are stored on storage device 120-1 of FIG. 1, and vectors 415-2, 415-3, and 415-5 of FIG. 4 are storage on storage device 120-2 of FIG. 1. In that case, manager 320 of FIG. 3 might send one I/O request to load modules 325-1 or 325-2 of FIG. 3 to read vectors 415-1 and 415-4 of FIG. 4, and another I/O request to load modules 325-3 or 325-4 of FIG. 3 to read vectors 415-2, 415-3, and 415-5 of FIG. 4. (Vectors 415-6 and 415-7 of FIG. 4 may be handled similarly, depending on where they might be stored.)

In addition, recall that multiple load modules 325 of FIG. 3 might have access to the same storage device 120 of FIG. 1. In that case, even if the data to be read is stored on, for example, just storage device 120-1 of FIG. 1, manager 320 of FIG. 3 might send two I/O requests: one to load module 325-1 of FIG. 3 and the other to load module 325-2 of FIG. 3. In this manner, manager 320 of FIG. 3 might expedite the reading of the data from storage device 120-1 of FIG. 1, even though a single load module 325 of FIG. 3 might be able to handle reading all the data from storage device 120-1 of FIG. 1.

Figure 6:
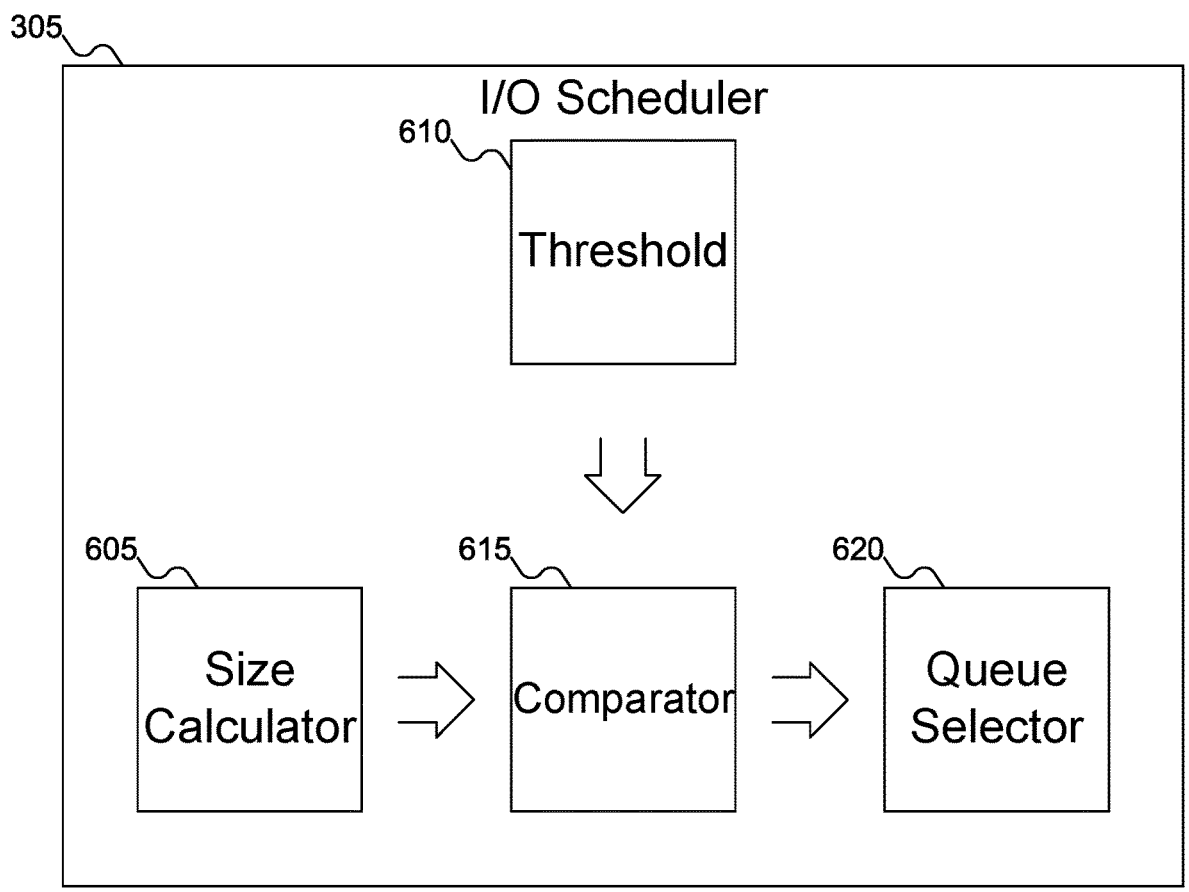
FIG. 6 shows details of the I/O scheduler of FIG. 3, according to embodiments of the disclosure.

FIG. 6 shows details of I/O scheduler 305 of FIG. 3, according to embodiments of the disclosure. In FIG. 6, I/O scheduler 305 may include size calculator 605, threshold 610, comparator 615, and queue selector 620. As discussed above with reference to FIGS. 3-4, I/O scheduler 305 may use the size of I/O request 405 of FIG. 4 to select queue 310 of FIG. 3 into which I/O request 405 of FIG. 4 may be placed. Size calculator 605 of FIG. 6 may determine the size of I/O request 405 of FIG. 4. Size calculator may use, among other data, the number of bytes to be read from the data according to I/O request 405 of FIG. 4, or the number of vectors 415 of FIG. 4 in combination with the number of data points in each vector 415 of FIG. 4 and the number of bytes per data point, to calculate the size of I/O request 405 of FIG. 4.

Once the size of I/O request 405 of FIG. 4 has been determined by size calculator 605, comparator 615 may compare the size of I/O request 405 of FIG. 4 with threshold 610. Threshold 610 may be any desired threshold against which the size of I/O request 405 of FIG. 4 may be compared, and queue selector 620 may use this information in selecting among queues 310 of FIG. 3 to place I/O request 405 of FIG. 4. If the size of I/O request 405 of FIG. 4, as determined by size calculator 605, is less than threshold 610 according to comparator 615, then queue selector 620 may select one queue 310 of FIG. 3 to place I/O request 405 of FIG. 4; otherwise, queue selector 620 may select another queue 310 of FIG. 3 to place I/O request 405 of FIG. 4.

While FIG. 6 shows one threshold 610, embodiments of the disclosure may include any number of thresholds 610, and comparator 615 may compare the size of I/O request 405 of FIG. 4 against each threshold 610 until the largest threshold 610 which is smaller than the size of I/O request 405 of FIG. 4 is identified (or alternatively, until the smallest threshold 610 which is larger than the size of I/O request 405 of FIG. 4 is identified). Queue selector 620 may then use this information to select queue 310 of FIG. 3 to place I/O request 405 of FIG. 4.

For example, as discussed above with reference to FIG. 3, queue 310-1 of FIG. 3 might be used to store I/O requests to retrieve data no larger than, say, 128 embedding vectors; queue 310-2 of FIG. 3 might be used to store I/O requests larger than, say, 128 embedding vectors but no larger than, say, 512 embedding vectors; and queue 310-3 of FIG. 3 might be used to store I/O requests larger than, say, 512 embedding vectors. For this example, two thresholds 610 might be used: one at 128 embedding vectors and another at 512 embedding vectors. Thus, in some embodiments of the disclosure, the number of queues 310 of FIG. 3 may be one greater than the number of thresholds 610 (with thresholds 610 acting as the dividing lines between pairs of queues 310 of FIG. 3).

Figure 7:
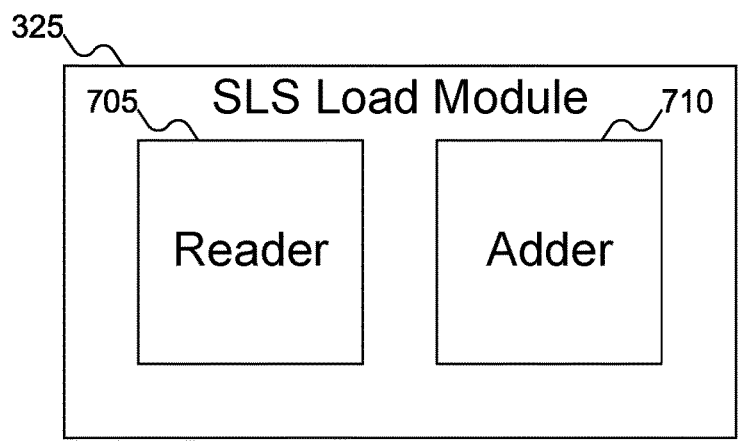
FIG. 7 shows details of the load module of FIG. 3, according to embodiments of the disclosure.

FIG. 7 shows details of load module 325 of FIG. 3, according to embodiments of the disclosure. As discussed with reference to FIG. 4 above, I/O request 405 of FIG. 4 might identify specific vectors 415 of FIG. 4 to be read from an embedding table. Because the number of vectors 415 of FIG. 4 in I/O request 405 of FIG. 4 may be small relative to the number of vectors in the data, most of the data may be ignored. Therefore, the data in storage devices 120 of FIG. 1 may be thought of as "sparse", in that most of the values may be ignored for purposes of satisfying I/O request 405 of FIG. 4.

When load module 325 is a sparse length sum load module, load module 325 may read the specific vectors 415 of FIG. 4 identified in I/O request 405 of FIG. 4, and add them together to produce a single vector. This sum of the identified vectors 415 of FIG. 4 may then be returned as the data requested by I/O request 405 of FIG. 4.

To operate as SLS load module 325, load module 325 may include reader 705 and adder 710. Reader 705 may read the specific vectors 415 of FIG. 4 identified in I/O request 405 of FIG. 4 from storage device 120 of FIG. 1. Note that in some embodiments of the disclosure reader 705 may access the data somehow from storage device 120 of FIG. 1; in other embodiments of the disclosure reader 705 may issue the appropriate commands to storage device 120 of FIG. 1, which may return the data to load module 325. Adder 710 may then add the vectors retrieved from storage device 120 of FIG. 1 to produce the data to be returned in response to I/O request 405 of FIG. 4.

Figure 8:
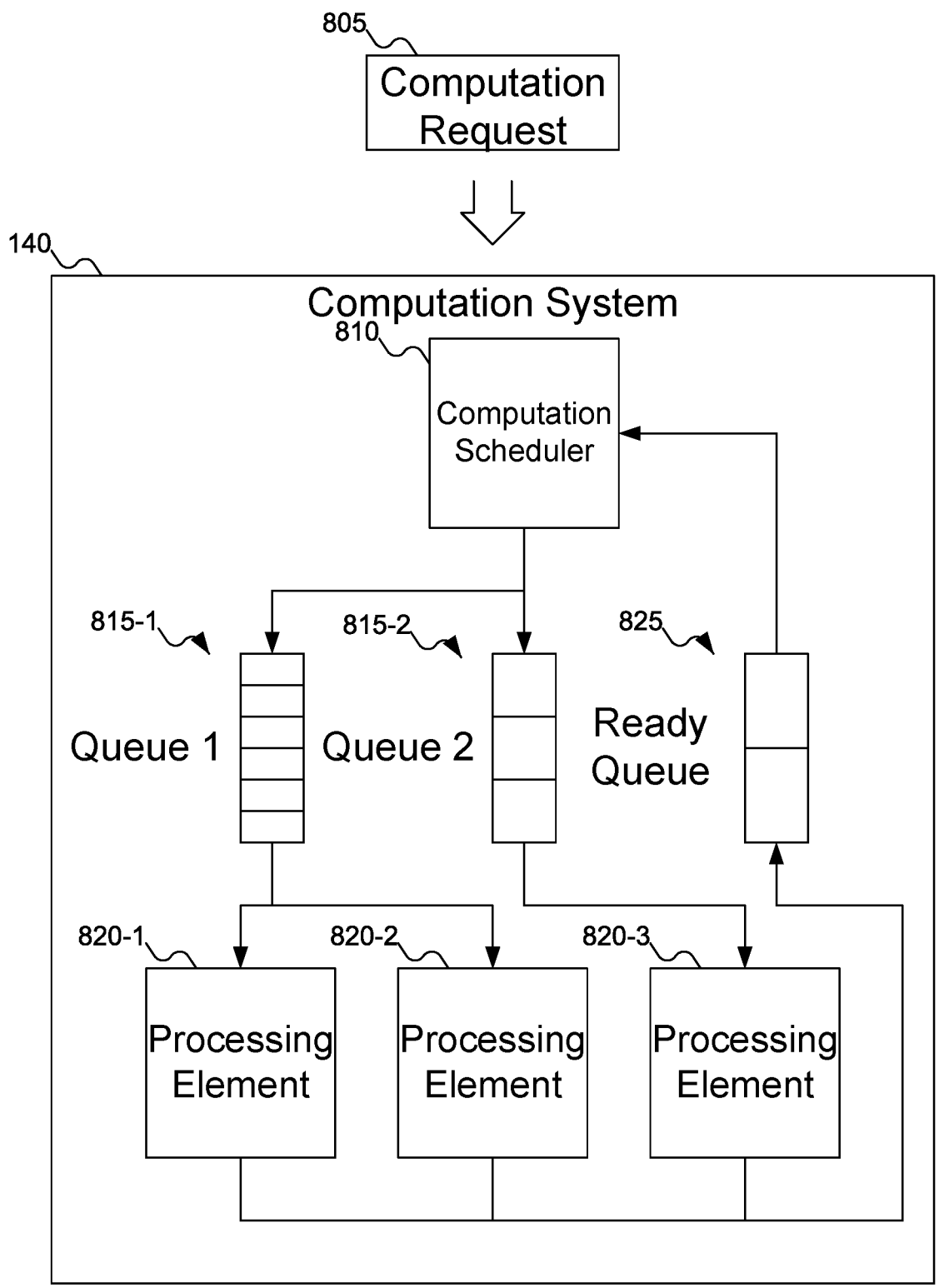
FIG. 8 shows details of the computation system of FIG. 1, according to embodiments of the disclosure.

FIG. 8 shows details of computation system 140 of FIG. 1, according to embodiments of the disclosure. In FIG. 8, computation system 140 may receive computation request 805, which may be a request to process data retrieved by multi-process system 135 of FIG. 1 in response to I/O request 405 of FIG. 4. Computation system 140 may include computation scheduler 810, queues 815-1 and 815-2 (which may be referred to collectively as queues 815), and processing elements 820-1, 820-2, and 820-3 (which may be referred to collectively as processing elements 820).

Computation scheduler 810 may place computation request 805 in one of queues 815 based on the workload of computation request 805. For example, computation request 805 might involve resources that are offered by only one of processing elements 820, which may determine in which queue 815 computation request 805 should be placed. Computation scheduler 810 may also consider how busy processing elements 820 are in assigning computation request 805 to processing elements 820, as discussed below.

In some embodiments of the disclosure, queues 815 may be FIFO queues. In other embodiments of the disclosure, other types of queues 815 may be used.

Processing element 820 may then remove computation request 805 from queues 815 and process the request. Processing element 820 may be any desired type of processing element: for example, a central processing unit (CPU), a graphics processing unit (GPU), a general purpose GPU (GPGPU), a neural processing unit (NPU), a tensor processing unit (TPU), or an accelerator such as a Field Programmable Gate Array (FPGA) or Application-Specific Integrated Circuit (ASIC), among other possibilities. In addition, for elements that include multiple cores (for example, a multi-core CPU), each core may be considered a separate processing element 820.

In some embodiments of the disclosure, each processing element 820 may have its own queue 815, from which it may receive computation requests to process. That is, processing element 820 might process only computation requests assigned specifically to that processing element, and might ignore computation requests assigned to other processing elements. In other embodiments of the disclosure, two or more processing elements may share a queue. For example, as shown in FIG. 8, processing elements 820-1 and 820-2 may both receive computation requests via queue 815-1, whereas processing element 820-3 may receive computation requests via queue 820-3. When a processing element has finished processing a computation request, the processing element may then examine the appropriate queue to see if another computation request is waiting that the processing element may process. If the processing element finds a computation request that it may process waiting, then the processing element may begin to process that computation request; otherwise, the processing element may go idle.

In some embodiments of the disclosure, a processing element might look for computation requests in multiple queues 815. For example, processing element 820-3 might be able to process any computation request that processing elements 820-1 and 820-2 may process, but might be able to process some additional computation requests as well. In that situation, processing element 820-3 might retrieve computation requests from queue 815-2 as long as queue 815-2 has computation requests waiting to be processed; if queue 815-2 is empty, the processing element 820-3 might retrieve a computation request from queue 815-1.

Computation system 140 may also include ready queue 825. Processing elements 820 may use ready queue 825 to inform computation scheduler 810 when they have finished processing a computation request. In this manner, computation scheduler 810 may keep track of how busy processing elements 820 are. For example, consider the situation where computation scheduler 810 receives computation request 805, and assume that each processing element 820 has its own queue 815. Computation scheduler 810 may determine that either of processing elements 820-1 or 820-2 may be capable of processing computation request. With no information about how busy processing elements 820-1 or 820-2 are, computation scheduler 810 might assign computation request 805 to the queues associated with processing elements 820-1 or 820-2 randomly. But if computation scheduler 810 receives information via ready queue 825 that processing element 820-2 has completed its most recent computation request (and therefore is currently idle), computation scheduler 810 may assign computation request 805 to processing element 820-2 without having to guess which of processing elements 820-1 or 820-2 have the lighter workload.

In a similar manner, while processing elements 820-1 or 820-2 might be the more desirable processing element to process computation request 805, if both processing elements 820-1 and 820-2 are currently busy and processing element 820-3 is currently idle, computation scheduler 810 may scheduler processing element 820-3 to process computation request 805, even if processing element 805-3 is less desirable to process computation request 805.

Computation request 805 may include a tag, identifying the computation request. Alternatively, computation scheduler 810 may assign a tag to computation request 805, thereby identifying the computation request. Processing elements 820 may use these tags in ready queue 825 to inform computation scheduler 810 about what computation requests have been completed. In this manner, computation scheduler 805 may maintain an approximate idea of the workloads pending for processing elements 820 (by comparing what computation requests each processing element 820 has processed with what computation requests have been scheduled for each processing element 820).

Figure 9:
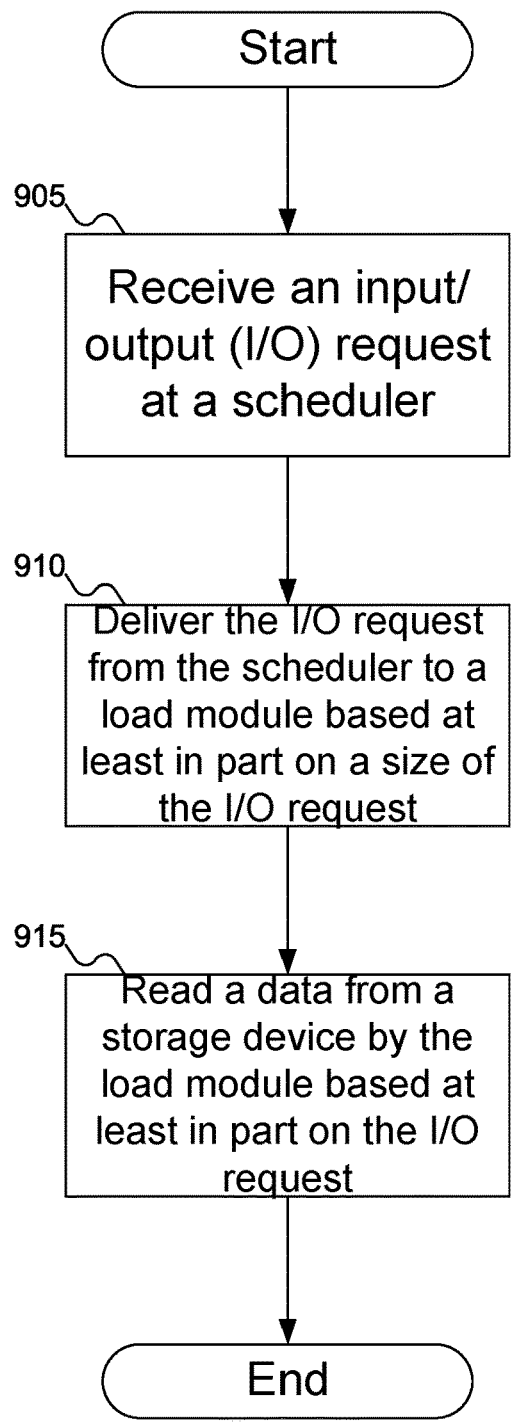
FIG. 9 shows a flowchart of an example procedure for processing the I/O request of FIG. 4 using the multi-process system of FIG. 1, according to embodiments of the disclosure.

FIG. 9 shows a flowchart of an example procedure for processing the I/O request of FIG. 4 using multi-process system 135 of FIG. 1, according to embodiments of the disclosure. In FIG. 9, at block 905, I/O scheduler 305 of FIG. 3 may receive I/O request 405 of FIG. 4. At block 910, I/O request 405 of FIG. 4 may be delivered from I/O scheduler 305 of FIG. 3 to load module 325 of FIG. 3. Finally, at block 915, load module 325 of FIG. 3 may read data from storage device 120 of FIG. 1 based on I/O request 405 of FIG. 4.

Figure 10:
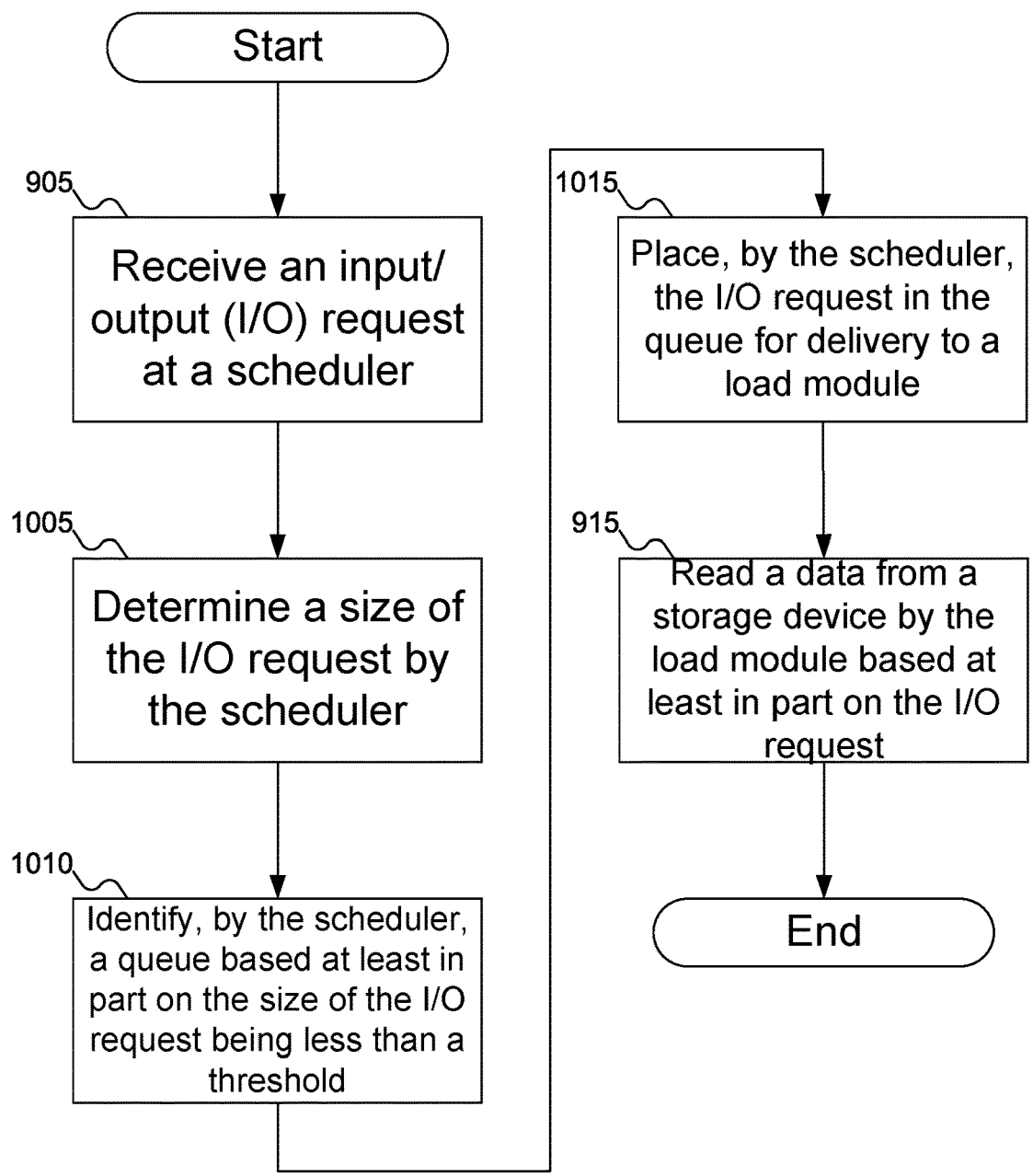
FIG. 10 shows an alternative flowchart of an example procedure for processing the I/O request of FIG. 4 using the multi-process system of FIG. 1, according to embodiments of the disclosure.

FIG. 10 shows an alternative flowchart of an example procedure for processing the I/O request of FIG. 4 using the multi-process system of FIG. 1, according to embodiments of the disclosure.

FIG. 10 shows an alternative flowchart of an example procedure for processing I/O request 405 of FIG. 4 using multi-process system 135 of FIG. 1, according to embodiments of the disclosure. In FIG. 10, blocks that are similar to blocks in FIG. 9 may be assigned use the same figure reference numbers. In FIG. 10, at block 905, I/O scheduler 305 of FIG. 3 may receive I/O request 405 of FIG. 4. At block 1005, size calculator 605 of FIG. 6 may determine the size of I/O request 405 of FIG. 4. At block 1010, queue selector 620 of FIG. 6 may select queue 310 of FIG. 3 for I/O request 405 of FIG. 4. At block 1015, I/O selector 305 of FIG. 3 may place I/O request 405 of FIG. 4 in queue 310 of FIG. 3 selected by queue selector 620 of FIG. 6. Finally, at block 915, load module 325 of FIG. 3 may read data from storage device 120 of FIG. 1 based on I/O request 405 of FIG. 4.

Figure 11:
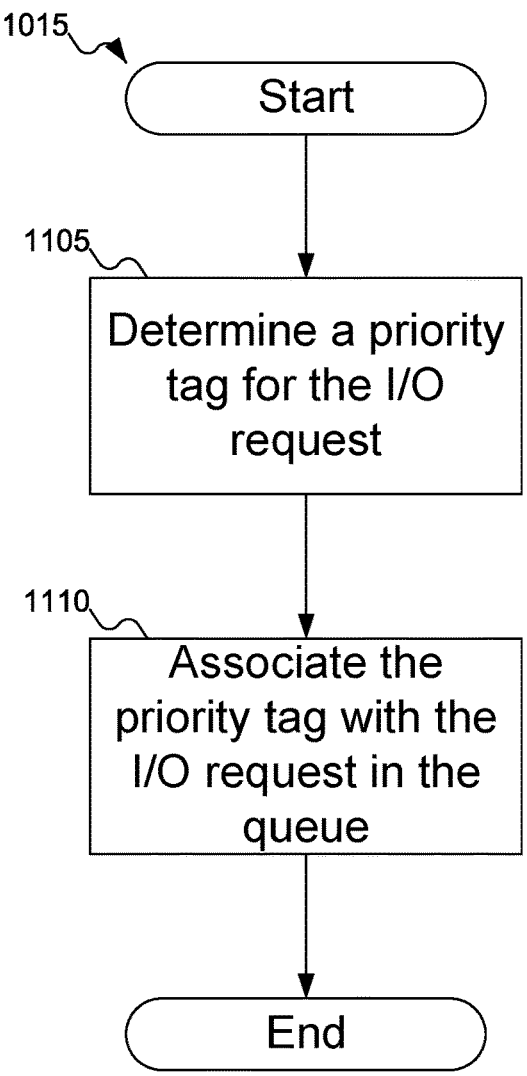
FIG. 11 shows a flowchart of an example procedure for the I/O scheduler of FIG. 3 to use priority queueing in queueing the I/O request of FIG. 4, according to embodiments of the disclosure.

FIG. 11 shows a flowchart of an example procedure for I/O scheduler 305 of FIG. 3 to use priority queueing in queueing I/O request 405 of FIG. 4, according to embodiments of the disclosure. In FIG. 11, at block 1105, I/O scheduler 305 of FIG. 3 may determine a priority tag for I/O request 405 of FIG. 4, based on the size of I/O request 405 of FIG. 4 (which may be determined by size calculator 605 of FIG. 6). At block 1110, I/O scheduler 305 of FIG. 3 may associate the priority tag with I/O request 405 of FIG. 3 in queue 310 of FIG. 3.

Figure 12:
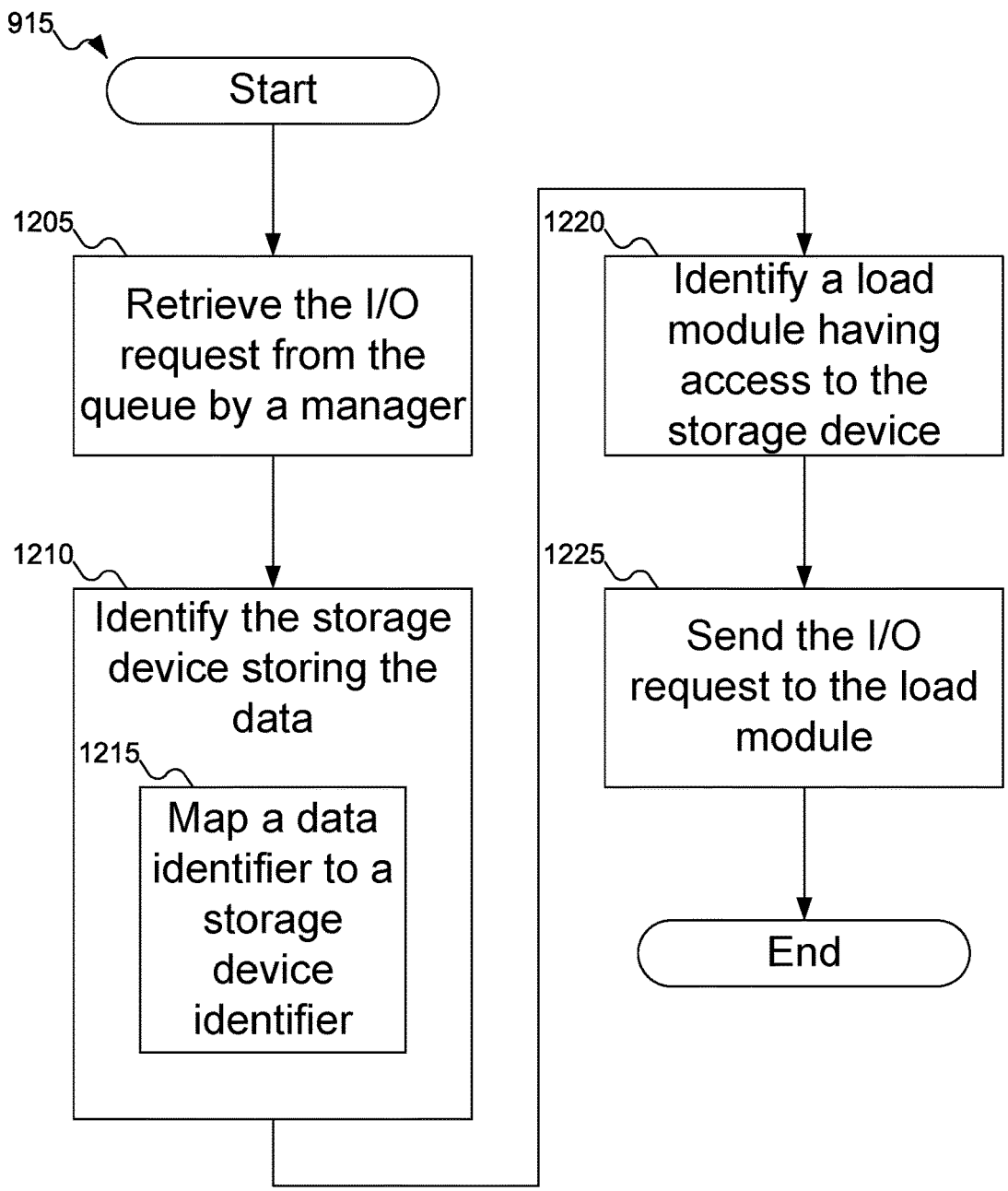
FIG. 12 shows a flowchart of an example procedure for the manager of FIG. 3 to assign the I/O request of FIG. 4 to the load module of FIG. 3, according to embodiments of the disclosure.

FIG. 12 shows a flowchart of an example procedure for manager 320 of FIG. 3 to assign I/O request 405 of FIG. 4 to load module 325 of FIG. 3, according to embodiments of the disclosure. In FIG. 12, at block 1205, manager 320 of FIG. 3 may retrieve I/O request 405 of FIG. 4 from queue 310 of FIG. 3. At block 1210, manager 320 of FIG. 3 may identify storage device 120 of FIG. 1 storing the data. This may involve, for example, mapping identifier 410 of FIG. 4 of the data to identifier 505 of FIG. 5 of the storage device storing the data using table 330 of FIG. 3, as shown at block 1215. At block 1220, manager 320 of FIG. 3 may identify load module 325 of FIG. 3 that has access to storage device 120 of FIG. 1. Finally, at block 1225, manager 320 of FIG. 3 may send I/O request 405 of FIG. 4 to load module 325 of FIG. 3.

Figure 13:
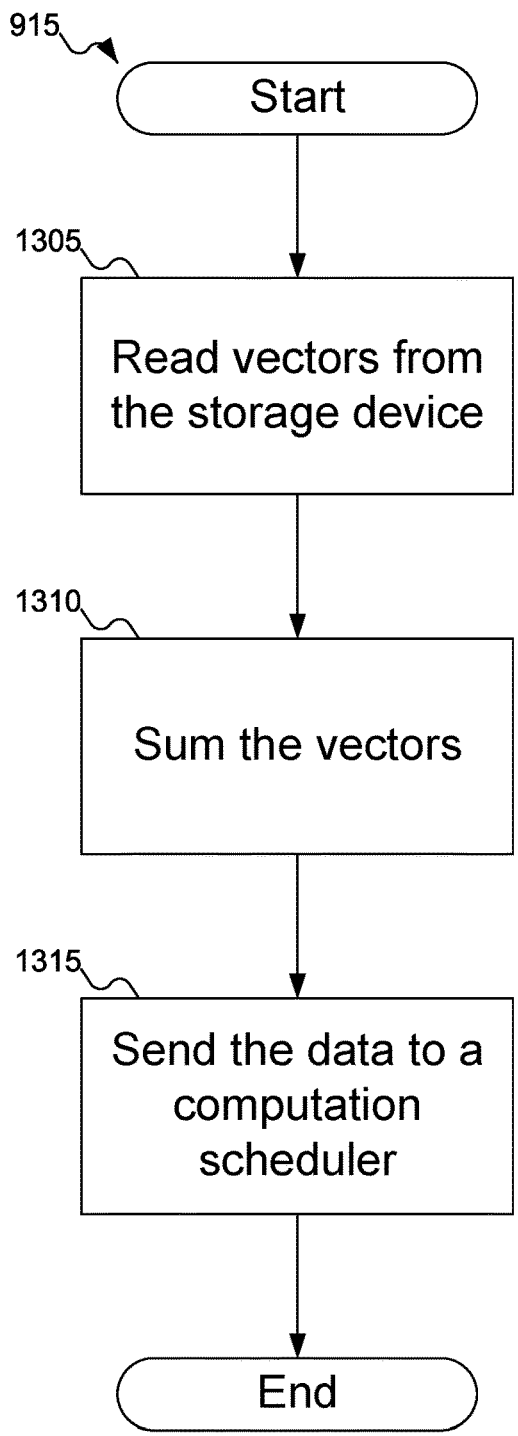
FIG. 13 shows a flowchart of an example procedure for the load module of FIG. 3 to read data from the storage device of FIG. 1, according to embodiments of the disclosure.

FIG. 13 shows a flowchart of an example procedure for load module 325 of FIG. 3 to read data from the storage device of FIG. 1, according to embodiments of the disclosure. In FIG. 13, at block 1305, reader 705 of FIG. 7 may read vectors 415 of FIG. 5 from storage device 120 of FIG. 1. At block 1310, adder 710 of FIG. 7 may sum vectors 415 of FIG. 4. Finally, at block 1315, multi-process system 135 of FIG. 1 may send the data to computation scheduler 810 of FIG. 8 of computation system 140 of FIG. 1, for use in processing computation request 805 of FIG. 8.

Figure 14:
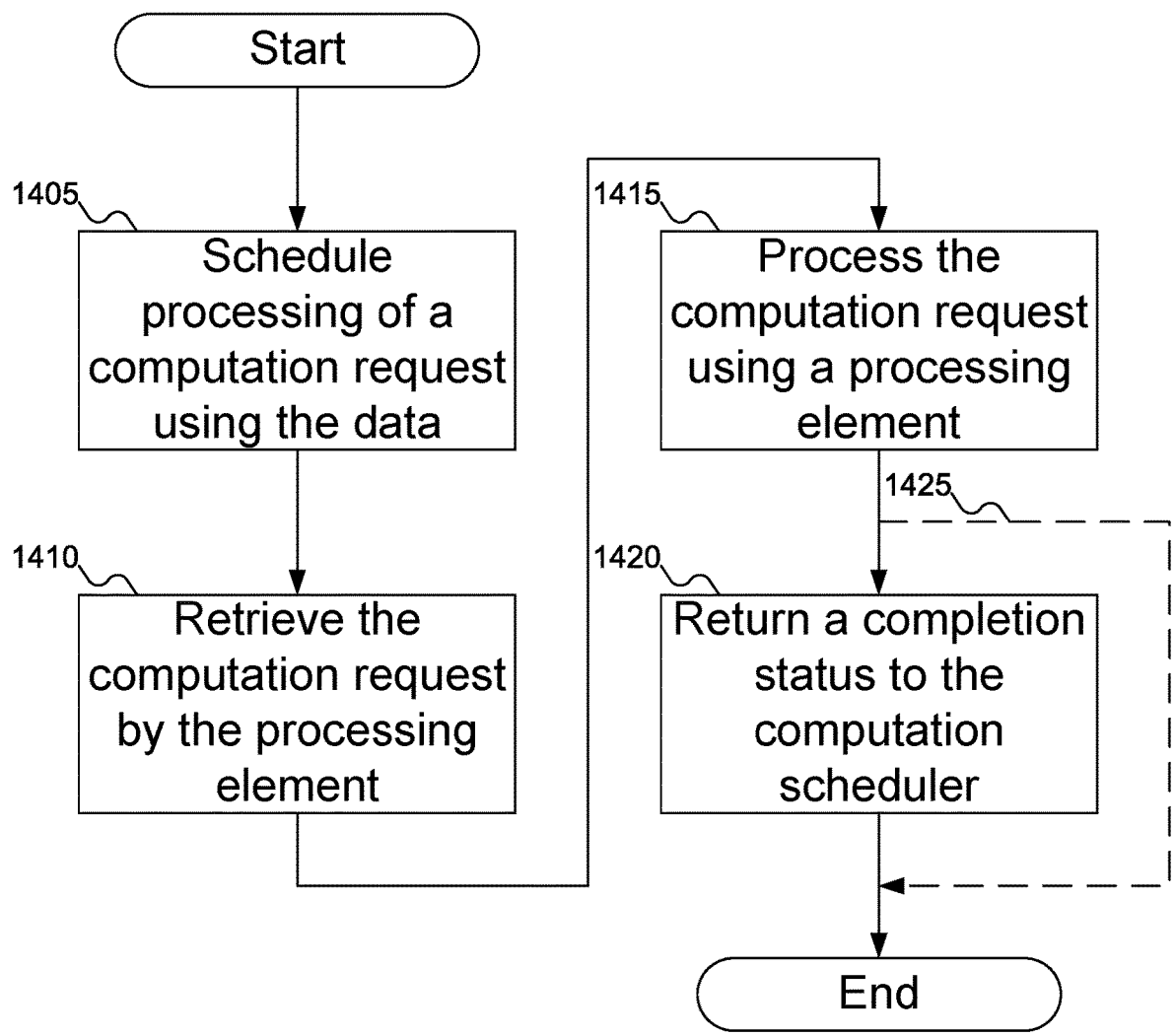
FIG. 14 shows a flowchart of an example procedure for the computation system of FIG. 1 to process the computation request of FIG. 8, according to embodiments of the disclosure.

FIG. 14 shows a flowchart of an example procedure for computation system 140 of FIG. 1 to process the computation request of FIG. 8, according to embodiments of the disclosure. In FIG. 14, at block 1405, computation scheduler 810 of FIG. 8 may schedule processing of computation request 805 of FIG. 4 using the data read by multi-process system 135 of FIG. 1 in response to I/O request 405 of FIG. 4. At block 1410, processing element 820 of FIG. 8 may receive computation request 805 of FIG. 8 from computation scheduler 810 of FIG. 8. For example, in block 1405 computation scheduler 810 of FIG. 8 may place computation request 805 of FIG. 8 in queue 815 of FIG. 8, and in block 1410 processing element 820 of FIG. 8 may retrieve computation request 805 of FIG. 8 from queue 815 of FIG. 8.

At block 1415, processing element 820 of FIG. 8 may process computation request 805 of FIG. 8. Finally, at block 1420, processing element 820 of FIG. 8 may inform computation scheduler 810 of FIG. 8 that it has completed processing of computation request 805 of FIG. 8. For example, processing element 820 of FIG. 8 may place information in ready queue 825 of FIG. 8 to inform computation scheduler 810 of FIG. 8 that processing element 820 of FIG. 8 has completed processing of computation request 805 of FIG. 8. In some embodiments of the disclosure, block 1420 may be omitted (for example, if only one computation request 805 of FIG. 8 is scheduled at processing element 820 of FIG. 8 and computation scheduler 810 of FIG. 8 knows how long it should take processing element 820 of FIG. 8 to process computation request 805 of FIG. 8), as shown by dashed line 1425.

Figure 15A:
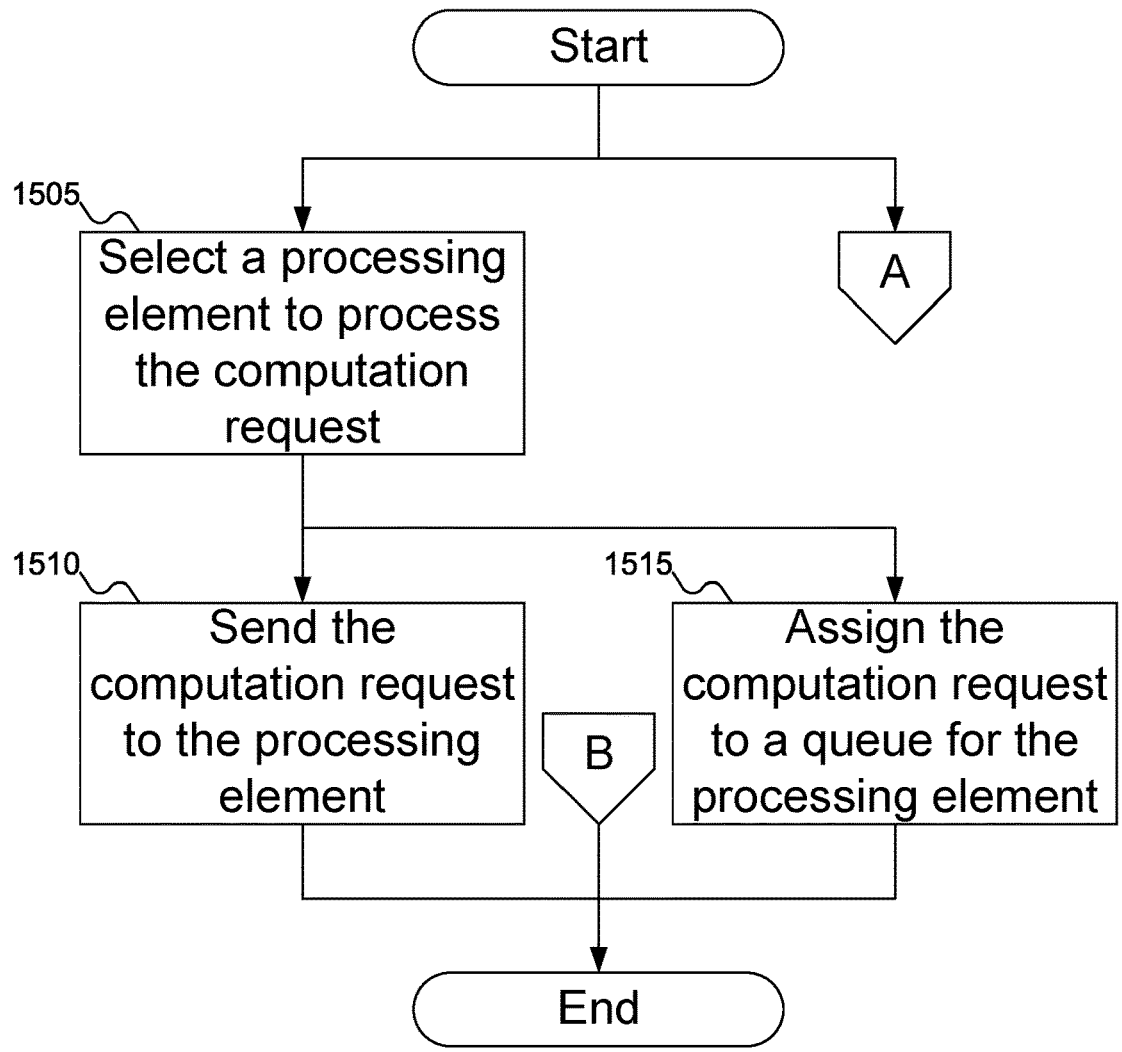
FIG. 15A shows a flowchart of an example procedure for the computation scheduler of FIG. 8 to arrange for the processing element of FIG. 8 to process the computation request of FIG. 8, according to embodiments of the disclosure.
Figure 15B:
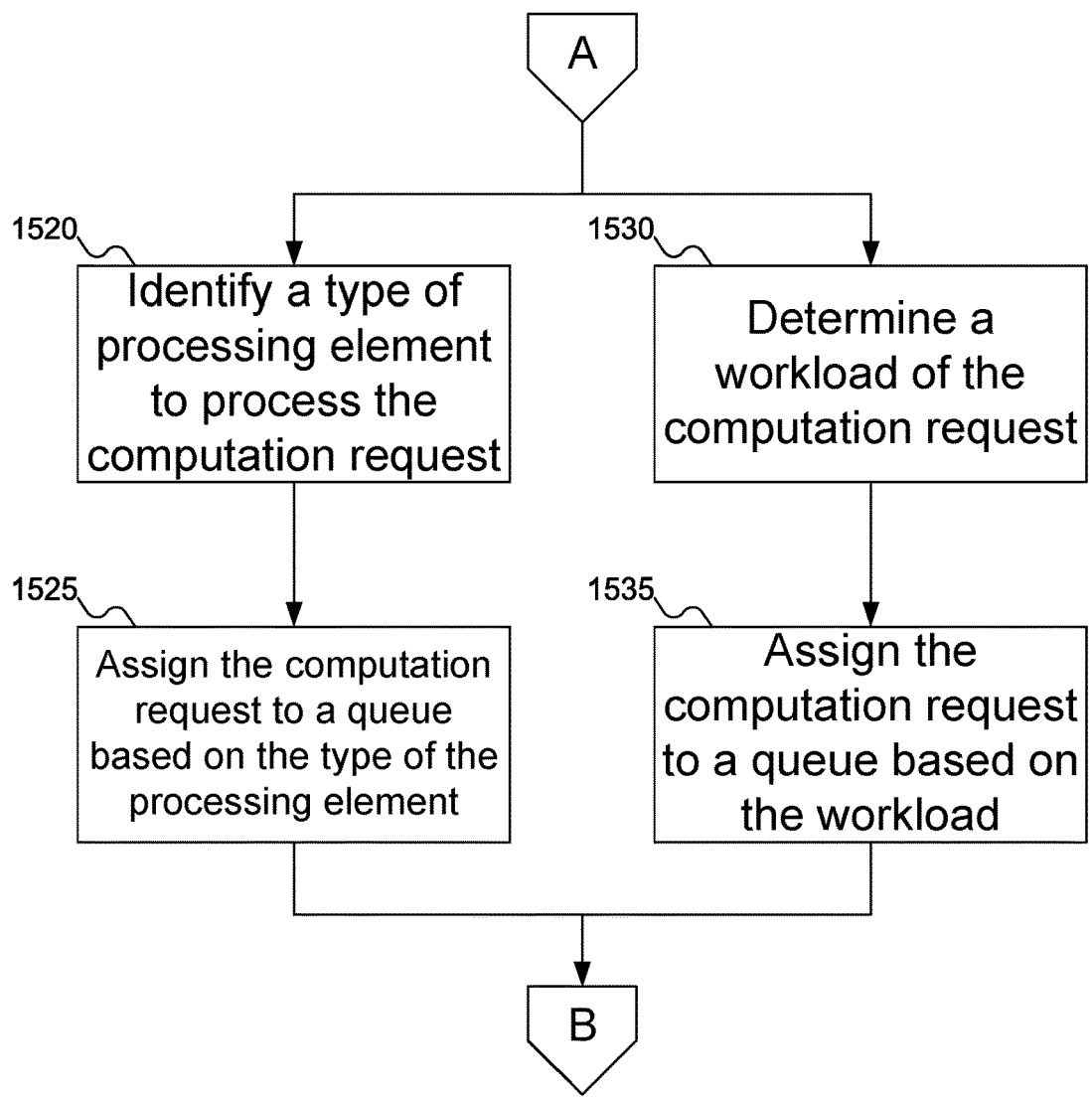
FIG. 15B continues the flowchart of FIG. 15A of the example procedure for the computation scheduler of FIG. 8 to arrange for the processing element of FIG. 8 to process the computation request of FIG. 8, according to embodiments of the disclosure.

FIGS. 15A-15B show a flowchart of an example procedure for computation scheduler 810 of FIG. 8 to arrange for processing element 820 of FIG. 8 to process computation request 805 of FIG. 8, according to embodiments of the disclosure. In FIG. 15A, at block 1505, computation scheduler 810 of FIG. 8 may select processing element 820 of FIG. 8 to process computation request 805 of FIG. 8. At block 1510, computation scheduler 810 of FIG. 8 may send computation request 805 of FIG. 8 to processing element 820 of FIG. 8. Alternatively, at block 1515, computation scheduler 810 of FIG. 8 may assign computation request 805 of FIG. 8 to queue 815 of FIG. 8.

Alternative to block 1505, at block 1520 (FIG. 15B), computation scheduler 810 of FIG. 8 may identify a type of processing element 820 of FIG. 8 suited to process computation request 805 of FIG. 8. At block 1525 computation scheduler 810 of FIG. 8 may assign computation request 805 of FIG. 8 to queue 815 of FIG. 8 appropriate to the type of processing element 820 of FIG. 8.

In yet another alternative to block 1505, at block 1530 computation scheduler 810 of FIG. 8 may determine a workload of computation request 805 of FIG. 8. At block 1535, computation scheduler 810 of FIG. 8 may assign computation request 805 of FIG. 8 to queue 815 of FIG. 8 based on the workload of computation request 805 of FIG. 8.

In FIGS. 9-15B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a multi-process system. The multi-process system may load data from an input/output (I/O) process/storage pool using an I/O request, which may be based on the data to be processed using a computation request. Data may be retrieved using load modules associated with the storage devices in the I/O process/storage pool. The use of multiple storage devices provides a technical advantage over data being stored in a single storage device by leveraging parallel data access from the multiple storage devices to achieve a low latency in reading the data.

Different I/O requests may be queued in different queues. The use of multiple queues provides a technical advantage in that I/O requests that may involve large or small amounts of data are not delayed by multiple I/O requests of other data sizes.

Data retrieved by the multi-process system may be provided to a computation system. The computation system may schedule computation requests using the data. The computation system may use different queues based on the workloads of the computation requests, providing a technical advantage to satisfy the query per second promised by a service level agreement.

Deep learning recommendation model (DLRM) workloads may be input/output (I/O) intensive. In order to meet their service level agreement (SLA) requirements, dynamic random access memory (DRAM) may be needed to store big embedding tables (up to 100 GB or more). Such large amounts of DRAM may be expensive.

For a small query size, a Solid State Drive (SSD) with a user space driver may be used to store embedding tables to satisfy an SLA. But for a reasonably large query size (>=256), it might be difficult for a single SSD to meet the SLA. Furthermore, with a single SSD, it may not be possible to execute queries in parallel to achieve a high query per second (QPS), because of a potential input/output (I/O) bottleneck in the SSD.

A query scheduler based on computations with multiple SSDs may have a low efficiency and may experience load balancing issues (with some SSDs handling a larger percentage of queries and other SSDs handling a smaller percentage of queries). SSDs handling large numbers of queries might have insufficient I/O to handle the queries (much like the single SSD model), and SSDs handling small numbers of queries may be under-utilized.

Embodiments of the disclosure may include a multiple process and multiple SSD system with I/O scheduler to achieve high QPS and low latency. A schedule embedding table IO may be used to schedule queries to different I/O queues.

The I/O process/SSD pool may fetch I/O requests from I/O queues based on the load status and I/O request for the various SSDs.

Inside the IO process/SSD pool, multiple SSDs may be accessed by multiple-process user-space non-volatile memory express (UNVME) driver/application programming interface (API) with various number of active threads to satisfy I/O requests.

A second level computation scheduler may be used to further optimize computation latency and QPS based on computation intensity.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
 a storage device to store a data;
 a load module to read the data from the storage device based at least in part on an input/output (I/O) request; and
 a scheduler to receive the I/O request and to deliver the I/O request to the load module based at least in part on a size of the I/O request.

Statement 2. An embodiment of the disclosure includes the system according to statement 1, wherein the scheduler is configured to deliver the I/O request to a queue based at least in part on the size of the I/O request.

Statement 3. An embodiment of the disclosure includes the system according to statement 2, further comprising a manager to retrieve the I/O request from the queue and to assign the I/O request to the load module.

Statement 4. An embodiment of the disclosure includes the system according to statement 3, wherein:
 the system further comprises:
  a second storage device storing a second data; and
  a second load module to read the second data from the second storage device; and
 the manager is configured to assign the I/O request to the load module based at least in part on the I/O request requesting the data.

Statement 5. An embodiment of the disclosure includes the system according to statement 4, wherein:
 the I/O request includes a first identifier of the data; and
 the manager includes a table mapping the first identifier of the data to a second identifier of the storage device.

Statement 6. An embodiment of the disclosure includes the system according to statement 3, wherein the system further comprises a second load module to read the data from the storage device.

Statement 7. An embodiment of the disclosure includes the system according to statement 6, wherein the manager is configured to select the load module to process the I/O request.

Statement 8. An embodiment of the disclosure includes the system according to statement 3, wherein:
 the queue includes a first in, first out (FIFO) queue; and
 the manager is configured to access the I/O request from a head of the queue.

Statement 9. An embodiment of the disclosure includes the system according to statement 3, wherein:
 the queue includes a priority queue;
 the scheduler is configured to associated a priority tag with the I/O request in the queue based at least in part on the size of the I/O request; and
 the manager is configured to access the I/O request from the queue based at least in part on the priority tag.

Statement 10. An embodiment of the disclosure includes the system according to statement 3, wherein:
 the scheduler includes a threshold; and
 the scheduler is configured to place the I/O request in the queue based at least in part on the size of the I/O request being less than the threshold.

Statement 11. An embodiment of the disclosure includes the system according to statement 10, wherein:
 the system further comprises a second queue; and the scheduler is configured to place a second I/O request in the second queue based at least in part on the size of the second I/O request exceeding the threshold.

Statement 12. An embodiment of the disclosure includes the system according to statement 11, wherein the manager is configured to retrieve the I/O request from the queue and the second I/O request from the second queue using a round robin access.

Statement 13. An embodiment of the disclosure includes the system according to statement 1, wherein the load module includes:
a reader to read a first vector and a second vector in the data from the storage device;
an adder to add the first vector and the second vector.

Statement 14. An embodiment of the disclosure includes the system according to statement 1, wherein the load module is configured to send the data to a second scheduler.

Statement 15. An embodiment of the disclosure includes the system according to statement 14, further comprising:
a processing element; and;
the second scheduler is configured to schedule processing of a computation request by the processing element, the computation request using the data.

Statement 16. An embodiment of the disclosure includes the system according to statement 14, wherein the second scheduler is configured to assign the computation request to a queue.

Statement 17. An embodiment of the disclosure includes the system according to statement 16, wherein the second scheduler is configured to assign the computation request to the queue based at least in part on a workload of the computation request.

Statement 18. An embodiment of the disclosure includes the system according to statement 16, wherein the processing element is configured to retrieve the computation request from the queue.

Statement 19. An embodiment of the disclosure includes the system according to statement 16, wherein:
the queue is associated with the processing element; and
the second scheduler is configured to assign a second computation request to a second queue associated with a second processing element.

Statement 20. An embodiment of the disclosure includes the system according to statement 16, wherein the queue is associated with a type of the processing element.

Statement 21. An embodiment of the disclosure includes the system according to statement 16, wherein the processing element is configured to return a completion status to the second scheduler.

Statement 22. An embodiment of the disclosure includes the system according to statement 21, wherein the processing element is configured to place the completion status in a second queue.

Statement 23. An embodiment of the disclosure includes the system according to statement 22, wherein the second scheduler is configured to retrieve the completion status from the second queue.

Statement 24. An embodiment of the disclosure includes the system according to statement 22, wherein a second processing element is configured to place a second completion status in the second queue.

Statement 25. An embodiment of the disclosure includes a method, comprising:
receiving an input/output (I/O) request at a scheduler;
delivering the I/O request from the scheduler to a load module based at least in part on a size of the I/O request; and
reading a data from a storage device by the load module based at least in part on the I/O request.

Statement 26. An embodiment of the disclosure includes the method according to statement 25, wherein delivering the I/O request from the scheduler to the load module based at least in part on the size of the I/O request includes:
determining the size of the I/O request by the scheduler;
identifying, by the scheduler, a queue based at least in part on the size of the I/O request; and
placing the I/O request in the queue by the scheduler.

Statement 27. An embodiment of the disclosure includes the method according to statement 26, wherein reading the data from the storage device by the load module includes:
retrieving the I/O request from the queue by a manager; and
sending the I/O request from the manager to the load module.

Statement 28. An embodiment of the disclosure includes the method according to statement 27, wherein sending the I/O request to the load module includes:
identifying, by the manager, the storage device storing the data; and
identifying, by the manager, the load module based at least in part on the load module having access the storage device.

Statement 29. An embodiment of the disclosure includes the method according to statement 28, wherein identifying, by the manager, the storage device storing the data by the manager includes mapping a first identifier of the I/O request to a second identifier of the storage device.

Statement 30. An embodiment of the disclosure includes the method according to statement 28, wherein identifying, by the manager, the storage device storing the data includes identifying, by the manager, the storage device storing the data from the storage device and a second storage device.

Statement 31. An embodiment of the disclosure includes the method according to statement 27, wherein:
the queue includes a first in, first out (FIFO) queue;
placing the I/O request in the queue by the scheduler includes:
determining a priority tag for the I/O request based at least in part on the size of the I/O request; and
associating the priority tag with the I/O request in the queue.

Statement 32. An embodiment of the disclosure includes the method according to statement 31, wherein retrieving the I/O request from the queue by the manager includes retrieving the I/O request from the queue by the manager based at least in part on the priority tag.

Statement 33. An embodiment of the disclosure includes the method according to statement 27, wherein identifying, by the scheduler, the queue based at least in part on the size of the I/O request includes identifying, by the scheduler, the queue based at least in part on the size of the I/O request being less than a threshold.

Statement 34. An embodiment of the disclosure includes the method according to statement 33, wherein identifying, by the scheduler, the queue based at least in part on the size of the I/O request further includes identifying, by the scheduler, a second queue based at least in part on the size of a second I/O request being larger than a threshold.

Statement 35. An embodiment of the disclosure includes the method according to statement 34, wherein retrieving the I/O request from the queue by the manager includes retrieving the I/O request from the queue and the second I/O request from the second queue using round robin access.

Statement 36. An embodiment of the disclosure includes the method according to statement 25, wherein reading the data from the storage device by the load module includes:
  reading a first vector from the storage device;
  reading a second vector from the storage device; and
  adding the first vector and the second vector to generate the data.

Statement 37. An embodiment of the disclosure includes the method according to statement 25, further comprising sending the data from the load module to a second scheduler.

Statement 38. An embodiment of the disclosure includes the method according to statement 37, further comprising scheduling a processing element to process a computation request using the data.

Statement 39. An embodiment of the disclosure includes the method according to statement 38, wherein scheduling the processing element to process the computation request using the data includes assigning the computation request to a queue.

Statement 40. An embodiment of the disclosure includes the method according to statement 39, wherein assigning the computation request to the queue includes assigning the computation request to the queue based at least in part on a workload of the computation request.

Statement 41. An embodiment of the disclosure includes the method according to statement 40, further comprising:
  retrieving the computation request from the queue by the processing element; and
  processing the computation request using the data by the processing element.

Statement 42. An embodiment of the disclosure includes the method according to statement 41, further comprising returning a completion status to the second scheduler from the processing element in a second queue.

Statement 43. An embodiment of the disclosure includes the method according to statement 39, further comprising retrieving the completion status from the second queue by the second scheduler.

Statement 44. An embodiment of the disclosure includes the method according to statement 43, further comprising retrieving a second completion status from the second queue by the second scheduler, the second completion status placed in the second queue by a second processing element.

Statement 45. An embodiment of the disclosure includes the method according to statement 39, wherein assigning the computation request to the queue includes assigning the computation request to the queue associated with the processing element.

Statement 46. An embodiment of the disclosure includes the method according to statement 39, wherein:
  scheduling the processing element to process the computation request using the data further includes identifying a type of the processing element based at least in part on the computation request; and
  assigning the computation request to the queue includes assigning the computation request to the queue associated with the type of the processing element.

Statement 47. An embodiment of the disclosure includes an article, comprising a non-transitory storage medium, the non-transitory storage medium having stored thereon instructions that, when executed by a machine, result in:
  receiving an input/output (I/O) request at a scheduler;
  delivering the I/O request from the scheduler to a load module based at least in part on a size of the I/O request; and
  reading a data from a storage device by the load module based at least in part on the I/O request.

Statement 48. An embodiment of the disclosure includes the article according to statement 47, wherein delivering the I/O request from the scheduler to the load module based at least in part on the size of the I/O request includes:
  determining the size of the I/O request by the scheduler;
  identifying, by the scheduler, a queue based at least in part on the size of the I/O request; and
  placing the I/O request in the queue by the scheduler.

Statement 49. An embodiment of the disclosure includes the article according to statement 48, wherein reading the data from the storage device by the load module includes:
  retrieving the I/O request from the queue by a manager; and
  sending the I/O request from the manager to the load module.

Statement 50. An embodiment of the disclosure includes the article according to statement 49, wherein sending the I/O request to the load module includes:
  identifying, by the manager, the storage device storing the data; and
  identifying, by the manager, the load module based at least in part on the load module having access the storage device.

Statement 51. An embodiment of the disclosure includes the article according to statement 50, wherein identifying, by the manager, the storage device storing the data by the manager includes mapping a first identifier of the I/O request to a second identifier of the storage device.

Statement 52. An embodiment of the disclosure includes the article according to statement 50, wherein identifying, by the manager, the storage device storing the data includes identifying, by the manager, the storage device storing the data from the storage device and a second storage device.

Statement 53. An embodiment of the disclosure includes the article according to statement 49, wherein:
  the queue includes a first in, first out (FIFO) queue;
  placing the I/O request in the queue by the scheduler includes:
    determining a priority tag for the I/O request based at least in part on the size of the I/O request; and
    associating the priority tag with the I/O request in the queue.

Statement 54. An embodiment of the disclosure includes the article according to statement 53, wherein retrieving the I/O request from the queue by the manager includes retrieving the I/O request from the queue by the manager based at least in part on the priority tag.

Statement 55. An embodiment of the disclosure includes the article according to statement 49, wherein identifying, by the scheduler, the queue based at least in part on the size of the I/O request includes identifying, by the scheduler, the queue based at least in part on the size of the I/O request being less than a threshold.

Statement 56. An embodiment of the disclosure includes the article according to statement 55, wherein identifying, by the scheduler, the queue based at least in part on the size of the I/O request further includes identifying, by the scheduler, a second queue based at least in part on the size of a second I/O request being larger than a threshold.

Statement 57. An embodiment of the disclosure includes the article according to statement 56, wherein retrieving the I/O request from the queue by the manager includes retrieving the I/O request from the queue and the second I/O request from the second queue using round robin access.

Statement 58. An embodiment of the disclosure includes the article according to statement 47, wherein reading the data from the storage device by the load module includes:

reading a first vector from the storage device;
reading a second vector from the storage device; and
adding the first vector and the second vector to generate the data.

Statement 59. An embodiment of the disclosure includes the article according to statement 47, the non-transitory storage medium having stored thereon further instructions that, when executed by the machine, result in sending the data from the load module to a second scheduler.

Statement 60. An embodiment of the disclosure includes the article according to statement 59, the non-transitory storage medium having stored thereon further instructions that, when executed by the machine, result in scheduling a processing element to process a computation request using the data.

Statement 61. An embodiment of the disclosure includes the article according to statement 60, wherein scheduling the processing element to process the computation request using the data includes assigning the computation request to a queue.

Statement 62. An embodiment of the disclosure includes the article according to statement 61, wherein assigning the computation request to the queue includes assigning the computation request to the queue based at least in part on a workload of the computation request.

Statement 63. An embodiment of the disclosure includes the article according to statement 62, the non-transitory storage medium having stored thereon further instructions that, when executed by the machine, result in:
retrieving the computation request from the queue by the processing element; and
processing the computation request using the data by the processing element.

Statement 64. An embodiment of the disclosure includes the article according to statement 63, the non-transitory storage medium having stored thereon further instructions that, when executed by the machine, result in returning a completion status to the second scheduler from the processing element in a second queue.

Statement 65. An embodiment of the disclosure includes the article according to statement 61, the non-transitory storage medium having stored thereon further instructions that, when executed by the machine, result in retrieving the completion status from the second queue by the second scheduler.

Statement 66. An embodiment of the disclosure includes the article according to statement 65, the non-transitory storage medium having stored thereon further instructions that, when executed by the machine, result in retrieving a second completion status from the second queue by the second scheduler, the second completion status placed in the second queue by a second processing element.

Statement 67. An embodiment of the disclosure includes the article according to statement 61, wherein assigning the computation request to the queue includes assigning the computation request to the queue associated with the processing element.

Statement 68. An embodiment of the disclosure includes the article according to statement 61, wherein:
scheduling the processing element to process the computation request using the data further includes identifying a type of the processing element based at least in part on the computation request; and
assigning the computation request to the queue includes assigning the computation request to the queue associated with the type of the processing element.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
a storage device including a storage media to store a data and a controller to access the data from the storage media;
a Sparse Length Sum (SLS) load module to read the data from the storage device based at least in part on an input/output (I/O) request, the I/O request including a first identifier of the data, the SLS load module external to the storage device, the SLS load module configured to read a first vector and a second vector of the data from the storage device, to sum the first vector and the second vector to produce a vector sum, and to return the vector sum;
a scheduler to receive the I/O request from a host and to place the I/O request in a queue based at least in part on a size of the data requested by the I/O request being less than a threshold;
a table mapping the first identifier of the data to a second identifier of the storage device; and
a manager to retrieve the I/O request from the queue and to assign the I/O request to the SLS load module based at least in part on the table and the first identifier of the data.

2. The system according to claim 1, wherein:
the system further comprises:
a second storage device including a second storage media storing a second data and a second controller to access the second data from the second storage media; and
a second SLS load module to read the second data from the second storage device; and
the manager is configured to assign the I/O request to the SLS load module based at least in part on the table and the first identifier of the data.

3. The system according to claim 1, wherein the system further comprises a second SLS load module to read the data from the storage device.

4. The system according to claim 3, wherein the manager is configured to select the SLS load module from the SLS load module and the second SLS load module to process the I/O request.

5. The system according to claim 1, wherein:
the system further comprises a second queue; and
the scheduler is configured to place a second I/O request received from the host in the second queue based at least in part on a second size of a second data requested by the second I/O request exceeding the threshold.

6. The system according to claim 5, wherein the manager is configured to retrieve the I/O request from the queue and the second I/O request from the second queue using a round robin access.

7. The system according to claim 1, wherein the SLS load module includes:
a reader to read a first vector and a second vector in the data from the storage device;
an adder to add the first vector and the second vector.

8. The system according to claim 1, wherein the SLS load module is configured to send the data to a second scheduler of a computation system to process the data based at least in part on the data being read from the storage device.

9. A method, comprising:
receiving an input/output (I/O) request from a host at a scheduler, the I/O request including a first identifier of a data;
determining, by the scheduler, a size of the data requested by the I/O request;
identifying, by the scheduler, a queue based at least in part on the size of data requested by the I/O request being less than a threshold;
placing the I/O request in the queue by the scheduler for delivery to a SLS load module;
retrieving the I/O request from the queue by a manager;
mapping the first identifier of the data to a second identifier of a storage device using a table;
sending the I/O request by a manager to a SLS load module based at least in part on the second identifier of the storage device; and
reading the data from the storage device by the SLS load module based at least in part on the I/O request, the SLS load module configured to read a first vector and a second vector of the data from the storage device, to sum the first vector and the second vector to produce a vector sum, and to return the vector sum,
wherein the storage device includes a storage media to store the data and a controller to access the data from the storage media, and
wherein the SLS load module is external to the storage device.

10. The method according to claim 9, wherein sending the I/O request to the SLS load module includes identifying, by the manager, the SLS load module based at least in part on the SLS load module having access to the storage device.

11. The method according to claim 9, further comprising:
receiving a second I/O request from a host at the scheduler;
determining, by the scheduler, a second size of a second data requested by the second I/O request;
identifying, by the scheduler, a second queue based at least in part on the second size of the second data requested by the second I/O request being larger than the threshold; and
placing the second I/O request in the second queue by the scheduler for delivery to the SLS load module.

12. The method according to claim 11, wherein retrieving the I/O request from the queue by the manager includes retrieving the I/O request from the queue and the second I/O request from the second queue using a round robin access.

13. The method according to claim 9, wherein reading the data from the storage device by the SLS load module includes:
reading a first vector from the storage device;
reading a second vector from the storage device; and
adding the first vector and the second vector to generate the data.

14. The method according to claim 9, further comprising sending the data from the SLS load module to a second scheduler of a computation system to process the data based at least in part on the data being read from the storage device.

15. An article, comprising a non-transitory storage medium, the non-transitory storage medium having stored thereon instructions that, when executed by a machine, result in:
receiving an input/output (I/O) request from a host at a scheduler, the I/O request including a first identifier of a data;
determining, by the scheduler, a size of the data requested by the I/O request;
identifying, by the scheduler, a queue based at least in part on the size of data requested by the I/O request being less than a threshold;
placing the I/O request in the queue by the scheduler for delivery to a SLS load module;
retrieving the I/O request from the queue by a manager;
mapping the first identifier of the data to a second identifier of a storage device using a table;
sending the I/O request by a manager to a SLS load module based at least in part on the second identifier of the storage device; and
reading the data from the storage device by the SLS load module based at least in part on the I/O request, the SLS load module configured to read a first vector and a second vector of the data from the storage device, to sum the first vector and the second vector to produce a vector sum, and to return the vector sum,
wherein the storage device includes a storage media to store the data and a controller to access the data from the storage media, and
wherein the SLS load module is external to the storage device.

16. The system according to claim 1, wherein:
the I/O request includes a logical address for the data; and
the storage device includes a mapping from the logical address for the data in the I/O request to a physical address for the data in the storage media.

17. The system according to claim 8, wherein the computation system includes:
a second queue to store a computation request to process the data;
the second scheduler is configured to place the computation request in the second queue; and
a processing element to execute the computation request.

18. The system according to claim 17, wherein the second scheduler is configured to place the computation request in the second queue based at least in part on a resource of the processing element requested by the computation request.

19. The system according to claim 17, wherein the second scheduler is configured to place the computation request in the second queue based at least in part on a workload of the processing element.

20. The method according to claim 14, wherein sending the data from the SLS load module to the second scheduler of the computation system to process the data based at least in part on the data being read from the storage device includes:
selecting a second queue of the computation system by the second scheduler;
placing a computation request to process the data in the second queue by the second scheduler; and
executing the computation request by a processing element of the computation system.

21. The method according to claim 20, wherein selecting the second queue of the computation system by the second scheduler includes selecting the second queue of the computation system based at least in part on a resource of the processing element requested by the computation request.

22. The method according to claim 20, wherein selecting the second queue of the computation system by the second scheduler includes selecting the second queue of the computation system based at least in part on a workload of the processing element.

23. The system according to claim 1, wherein the SLS load module receives the I/O request from a host, the host external to the SLS load module.

24. The system according to claim 1, wherein the table further maps a third identifier of a second data to the second identifier of the storage device, the third identifier of the second data different from the first identifier of the data.

\* \* \* \* \*